United States Patent
Sakata

(10) Patent No.: US 11,766,617 B2
(45) Date of Patent: Sep. 26, 2023

(54) NON-TRANSITORY MEDIUM AND VIDEO GAME PROCESSING SYSTEM

(71) Applicant: SQUARE ENIX CO., LTD., Tokyo (JP)

(72) Inventor: Shinpei Sakata, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/446,272

(22) Filed: Aug. 27, 2021

(65) Prior Publication Data

US 2022/0062767 A1    Mar. 3, 2022

(30) Foreign Application Priority Data

Aug. 31, 2020 (JP) .................................. 2020-146126

(51) Int. Cl.
    A63F 13/00 (2014.01)
    A63F 13/57 (2014.01)
    A63F 13/35 (2014.01)

(52) U.S. Cl.
    CPC .............. *A63F 13/57* (2014.09); *A63F 13/35* (2014.09)

(58) Field of Classification Search
    CPC .................................. A63F 13/35; A63F 13/57
    See application file for complete search history.

(56) References Cited

U.S. PATENT DOCUMENTS

| 10,074,381 B1* | 9/2018 | Cowburn | G06F 40/58 |
| 10,761,680 B2* | 9/2020 | Lee | G06F 3/04817 |
| 2009/0102975 A1 | 4/2009 | Arai | |
| 2012/0230586 A1 | 9/2012 | Blennerhassett | |
| 2013/0100166 A1* | 4/2013 | Nonaka | G06T 11/60 345/636 |
| 2014/0081634 A1* | 3/2014 | Forutanpour | G06F 40/58 704/235 |
| 2015/0067482 A1* | 3/2015 | Georgiev | G06F 40/103 715/244 |
| 2016/0330150 A1* | 11/2016 | Joe | G06F 3/0486 |
| 2016/0342316 A1* | 11/2016 | Cho | G06F 16/148 |

(Continued)

FOREIGN PATENT DOCUMENTS

| JP | 2003296743 A | 10/2003 |
| JP | 2004128614 A | 4/2004 |

(Continued)

OTHER PUBLICATIONS

[English Translation] Notification of Reasons for Refusal dated Aug. 31, 2021 for Japanese Application No. 2020-146126, pp. all.

(Continued)

*Primary Examiner* — Dmitry Suhol
*Assistant Examiner* — Jason Pinheiro
(74) *Attorney, Agent, or Firm* — Dorsey & Whitney LLP

(57) ABSTRACT

A bubble creation method to be implemented by a server controls a progress of a video game. The bubble creation method includes a calculation formula specifying portion that is configured to specify one or more calculation formulas, and a bubble creation portion that is configured to create a bubble having an appearance defined by the calculation formula. The calculation formula has variables. The bubble creation portion creates a bubble whose appearance changes in accordance with a change of a value of the variable.

20 Claims, 28 Drawing Sheets

(56) References Cited

U.S. PATENT DOCUMENTS

| | | | |
|---|---|---|---|
| 2018/0026922 A1* | 1/2018 | Perigault | H04L 51/043 |
| | | | 715/758 |
| 2018/0183921 A1* | 6/2018 | Choi | G06F 3/04817 |
| 2018/0280802 A1 | 10/2018 | Stroud | |
| 2018/0300917 A1* | 10/2018 | Barnett | H04N 5/23293 |
| 2019/0068529 A1* | 2/2019 | Mullins | H04N 13/332 |
| 2020/0193163 A1* | 6/2020 | Chang | G06F 3/013 |
| 2020/0294298 A1* | 9/2020 | Chaney | H04N 9/3194 |
| 2020/0312029 A1* | 10/2020 | Heinen | G06T 19/006 |

FOREIGN PATENT DOCUMENTS

| | | | |
|---|---|---|---|
| JP | 2006247281 A | 9/2006 | |
| JP | 2012178060 A | 9/2012 | |
| JP | 2012190455 A | 10/2012 | |
| JP | 2016115128 A | 6/2016 | |
| JP | 2017018414 A | 1/2017 | |

OTHER PUBLICATIONS

Examination Report for Indian Patent Application No. 202144039335 dated Jun. 15, 2023, pp. all.

\* cited by examiner

CALCULATION FORMULA A:
length(p) - r

CALCULATION FORMULA B:
max(abs(p.x) − size.x, abs(p.y) −size.y)

FIG. 17

| CALCULATION FORMULA | BASIC SHAPE | VARIABLE 1 | VARIABLE 2 | BUBBLE APPEARANCE CHANGE |
|---|---|---|---|---|
| CALCULATION FORMULA 001 | ELLIPTICAL SHAPE | HP OF CHARACTER | | WHEN HP BECOMES SMALL, LENGTH OF BUBBLE IN MAJOR AXIS DIRECTION IS INCREASED, AND LENGTH OF BUBBLE IN MINOR AXIS DIRECTION IS REDUCED. |
| CALCULATION FORMULA 002 | ELLIPTICAL SHAPE | NUMBER OF CHARACTERS OR WORDS OF LINE | | WHEN THE NUMBER OF CHARACTERS OR WORDS IS LARGE, LENGTH OF ELLIPTICAL SHAPE IN MAJOR AXIS DIRECTION ARE LARGE. |
| CALCULATION FORMULA 003 | CIRCULAR SHAPE | ANGER LEVEL BASED ON CONTENT OF LINE (NORMAL 0 TO RAGE 10) | | WHEN ANGER LEVEL IS HIGH, THORNS IN BUBBLE FRAME ARE LARGE. |
| CALCULATION FORMULA 004 | CIRCULAR SHAPE | BRAVERY LEVEL OF CHARACTER (1 TO 255) | DISTANCE TO ENEMY CHARACTER | EXPANSION TO CONTRACTION OF CIRCLE IS REPEATED AT PREDETERMINED CYCLE. WHEN BRAVERY LEVEL IS LOW, AMPLITUDE OF RADIUS OF CIRCLE IS INCREASED. WHEN DISTANCE TO ENEMY CHARACTER IS CLOSE, SPEED OF CHANGE OF RADIUS OF CIRCLE IS FAST. |
| CALCULATION FORMULA 005 | CLOUD SHAPE | | | NO VARIABLE. BUBBLE OF FIXED SIZE IS CREATED. |
| CALCULATION FORMULA 006 | RECTANGULAR SHAPE | GAME OPERATING TIME | | WHEN OPERATING TIME IS LONG, TRANSPARENCY OF BUBBLE IS HIGH. |
| CALCULATION FORMULA 007 | ELLIPTICAL SHAPE | NUMBER OF SPEAKERS OF LINE | | WHEN THE NUMBER OF SPEAKERS IS LARGE, THE NUMBER OF CONCENTRIC BUBBLE FRAMES IS INCREASED. |
| CALCULATION FORMULA 008 | CIRCULAR SHAPE | ANGER LEVEL BASED ON CONTENT OF LINE (NORMAL 0 TO RAGE 10) | | WHEN ANGER LEVEL IS HIGH, COLOR OF BUBBLE IS CLOSE TO RED. |
| CALCULATION FORMULA 009 | CIRCULAR SHAPE | VOLUME OF LINE (1 TO 20) | | WHEN VOLUME IS HIGH, THORNS IN BUBBLE FRAME IS LARGE, BUBBLE ALSO BECOMES LARGE. |
| CALCULATION FORMULA 010 | RECTANGULAR SHAPE WITHOUT CORNERS | VOICE QUALITY OF LINE (BREATH LEAKAGE LEVEL 1 TO 10) | | WHEN BREATH LEAKAGE LEVEL OF VOICE IS HIGH, STRONG BLUR PROCESSING IS APPLIED TO BUBBLE. |
| CALCULATION FORMULA 011 | CIRCULAR SHAPE | COORDINATE VALUE OF GAZING POSITION ON GAME SCREEN (X, Y) | | WHEN GAZING POSITION IS ON PREDETERMINED AREA OF GAME SCREEN, THORNS OF BUBBLE FRAME ARE EXTENDED. |
| CALCULATION FORMULA 012 | CIRCULAR SHAPE | DISTANCE TO ENEMY CHARACTER | | WHEN DISTANCE IS REDUCED, THORNS IN BUBBLE FRAME ARE INCREASED. |
| CALCULATION FORMULA 013 | CIRCULAR SHAPE | TENSION LEVEL OF PLAYER | | WHEN TENSION LEVEL IS HIGH, THORNS IN BUBBLE FRAME ARE INCREASED. |

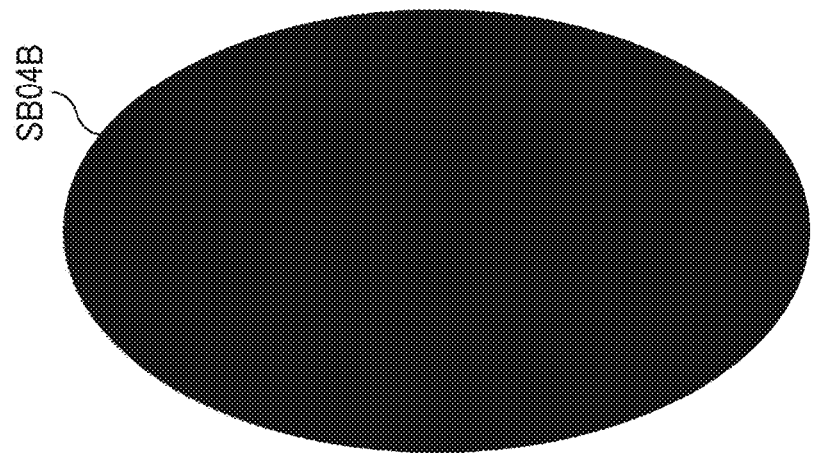
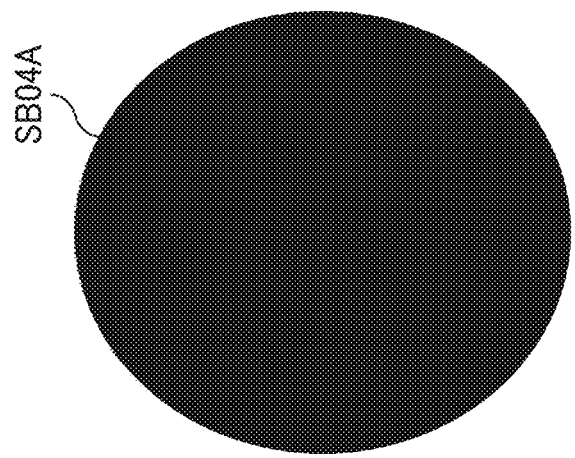
FIG. 19

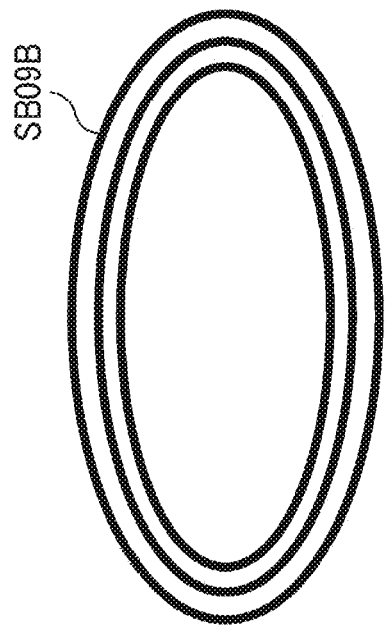
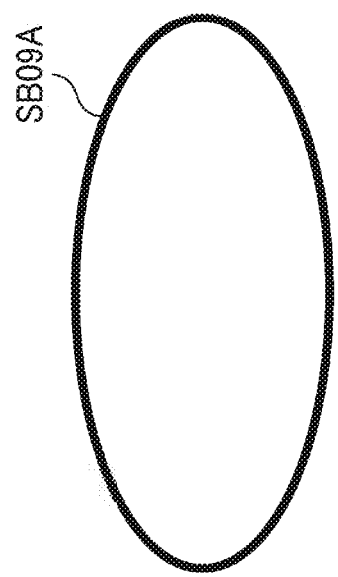
FIG. 24

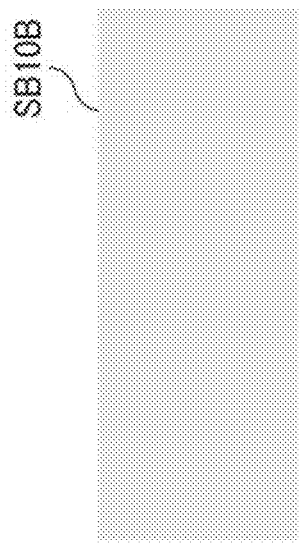
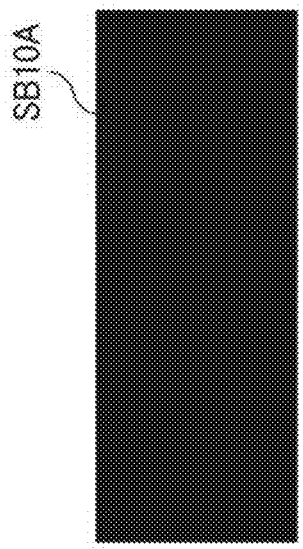
FIG. 25

NON-TRANSITORY MEDIUM AND VIDEO GAME PROCESSING SYSTEM

CROSS-REFERENCE TO RELATED APPLICATION(S)

This application claims priority to and the benefit of Japanese Patent Application No. 2020-146126 filed on Aug. 31, 2020, the disclosure of which are incorporated herein by reference in its entirety for any purpose.

BACKGROUND

At least one embodiment of the present disclosure relates to a bubble creation method and a video game processing system.

A bubble such as a speech bubble may be displayed on a game screen of a video game. Generally, image data of a bubble having a basic shape is prepared in advance as an asset (material).

Example of such computer program for displaying contact information together with a bubble image may be found in Japanese Patent Publication 2017-018414 A.

SUMMARY

A game player visually recognizes a bubble displayed on a game screen. Therefore, when a computer device can display a bubble having an appearance with an improved performance effect on the game screen, an interest of the player in the video game is improved.

An object of at least one embodiment of the present disclosure is to solve the above problems and to improve the interest of a player in a video game.

According to a non-limiting aspect, a bubble creation method according to the present disclosure is implemented by a server that controls a progress of a video game. The bubble creation method includes a calculation formula specifying function that is configured to specify one or more calculation formulas, and a bubble creation function that is configured to create a bubble having an appearance defined by the calculation formula.

According to another non-limiting aspect, a video game processing system according to the present disclosure controls a progress of a video game, and has a communication network, a server, and a user terminal. The video game processing system includes a calculation formula specifying unit that is configured to specify one or more calculation formulas, and a bubble creating unit that is configured to create a bubble having an appearance defined by the calculation formula.

Further, according to still another non-limiting aspect, a bubble creation method is implemented by a user terminal. The bubble creation method includes a calculation formula specifying step that specifies one or more calculation formulas, and a bubble creation step that creates a bubble having an appearance defined by the calculation formula.

According to each of the embodiments of the present application, one or two or more shortages are solved.

BRIEF DESCRIPTION OF DRAWINGS

FIG. 17 is a diagram showing examples of calculation formulas defined for creating bubbles according to at least one of the embodiments of the present disclosure.

FIG. 19 is a diagram showing a change of a bubble corresponding to a variable according to at least one of the embodiments of the present disclosure.

FIG. 24 is a diagram showing a change of a bubble corresponding to a variable according to at least one of the embodiments of the present disclosure.

FIG. 25 is a diagram showing a change of a bubble corresponding to a variable according to at least one of the embodiments of the present disclosure.

DESCRIPTION

Hereinafter, examples of embodiments of the present disclosure will be described with reference to the drawings. It should be noted that various components in the examples of the embodiments described below can be appropriately combined within a range in which contradiction or the like does not occur. Description of contents described as an example of an embodiment may be omitted in other embodiments. Contents of operations and processing that are not related to a feature part of the embodiments may be omitted. Further, an order of various processing constituting various flows and sequences to be described below is random as long as no contradiction or the like occurs in the contents of the processing.

First Embodiment

A summary of a first embodiment of the present disclosure will be described. Hereinafter, a bubble creation program executed in a server will be described as an example of the first embodiment. Herein, a bubble includes a speech bubble or a word balloon inside which a character's words or thoughts or designs and so on are written.

Figure 1:
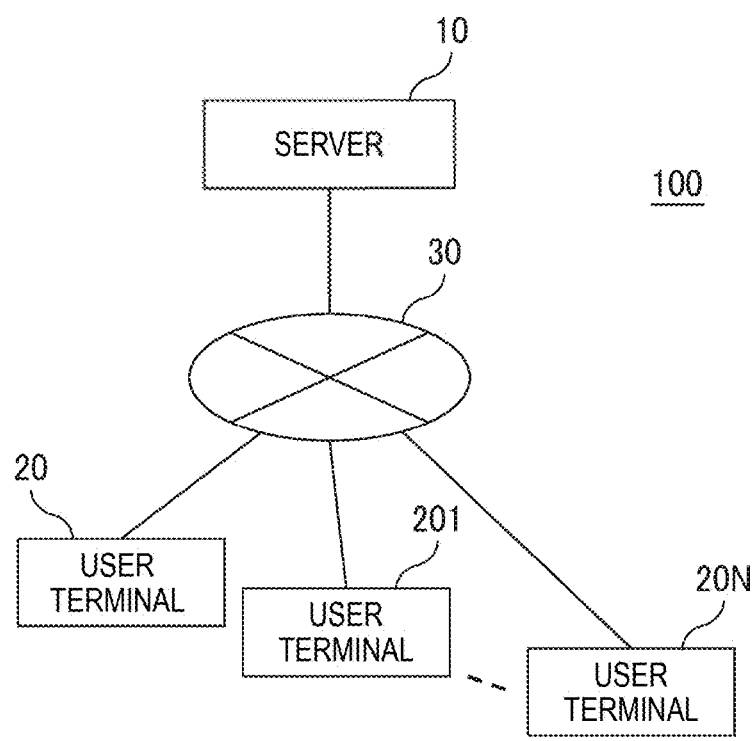
FIG. 1 is a block diagram showing a configuration example of a video game processing system according to at least one of embodiments of the present disclosure.
Figure 2:
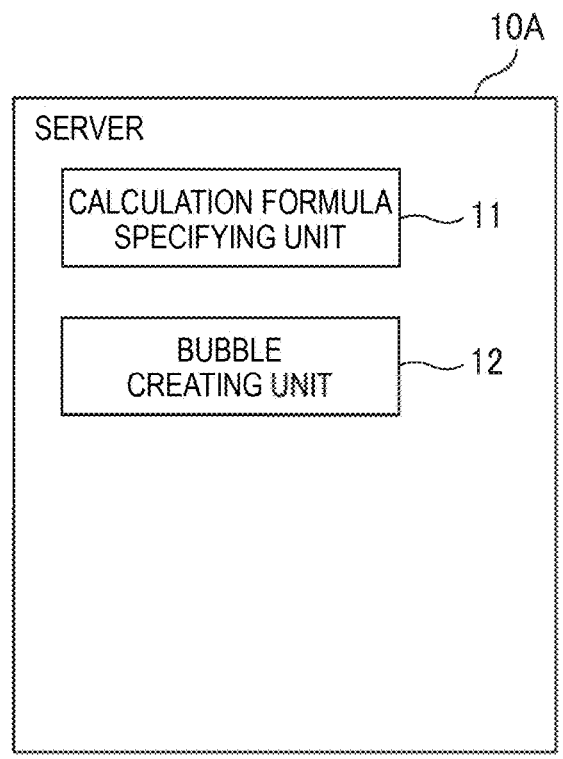
FIG. 2 is a block diagram showing a configuration of a server according to at least one of the embodiments of the present disclosure.

FIG. 1 is a block diagram showing a configuration example of a video game processing system according to at least one of the embodiments of the present disclosure. A video game processing system 100 includes a video game processing server 10 (server 10) and user terminals 20 and 201 to 20N (N is an integer that can be freely set) used by a user (game player or the like) of the video game processing system 100. A configuration of the video game processing system 100 is not limited thereto. For example, the video game processing system 100 may have a configuration in which a single user terminal is used by a plurality of users. The video game processing system 100 may include a plurality of servers.

The server 10 and the plurality of user terminals 20 and 201 to 20N are communicably connected to a communication network 30 such as the Internet. The connection between the communication network 30 and the server 10 and the connection between the communication network 30 and the plurality of user terminals 20 and 201 to 20N may be a wired connection or a wireless connection. For example, the plurality of user terminals 20 and 201 to 20N may be connected to the communication network 30 by performing, via a wireless communication line, data communication with a base station managed by a communication service provider.

The video game processing system 100 includes the server 10 and the plurality of user terminals 20 and 201 to 20N so as to achieve various functions for executing various processing in accordance with an operation of a user.

The server 10 controls the progress of a video game. The server 10 is managed by an administrator of the video game processing system 100, and has various functions for providing information related to various processing to the plurality of user terminals 20 and 201 to 20N. In the present example, the server 10 is configured by an information processing device such as a WWW server, and includes a storage unit (a storage medium or a storage device) that stores various kinds of information. The server 10 has a general configuration serving as a computer for executing various processing, such as a control unit and a communication unit, and description thereof will be omitted here. In the video game processing system 100, it is preferable that the server 10 manages various kinds of information from the viewpoint of reducing a processing load on each of the plurality of user terminals 20 and 201 to 20N_The storage unit that stores various kinds of information may be provided with a storage area in a state in which the storage area can be accessed by the server 10, and may be provided with, for example, a dedicated storage area outside the server 10.

Each of the plurality of user terminals 20 and 201 to 20N is managed by a user, and is configured by a communication terminal that can be used to play a network distribution type game. Examples of the communication terminal that can be used to play a network distribution type game include a mobile phone terminal, a personal digital assistant (PDA), a portable game device, VR goggles, a so-called wearable device, and the like. A configuration of a user terminal that can be provided in the video game processing system 100 is not limited thereto, and may be any configuration as long as a user can recognize a composite image. Other examples of the configuration of the user terminal include a combination of various communication terminals, a personal computer, and a stationary game device.

Each of the plurality of user terminals 20 and 201 to 20N is connected to the communication network 30 and includes hardware (for example, a display device that displays a browser screen or a game screen according to coordinates) and software that are used to execute various processing by communicating with the server 10. Each of the plurality of user terminals 20 and 201 to 20N may be configured to be able to directly communicate with one another without communicating with one another via the server 10.

Each of the plurality of user terminals 20 and 201 to 20N may have a built-in display device. A display device may be connected to each of the user terminals 20 and 201 to 20N in a wireless or wired manner. Since the display device has a very general configuration, description thereof is omitted here. A game screen is displayed on the display device as, for example, the composite image described above, and a user recognizes the composite image. For example, the game screen is displayed on a display that is an example of a display device provided in the user terminal or a display that is an example of a display device connected to the user terminal. Examples of the display device include a hologram display device that can perform a hologram display and a projection device that projects an image (including a game screen) onto a screen or the like.

2 is a block diagram showing a configuration of a server according to at least one of the embodiments of the present disclosure. A server 10A that is a configuration example of the server 10 includes at least a calculation formula specifying unit 11 and a bubble creating unit 12. A processor provided in the server 10A functionally implements the calculation formula specifying unit 11 and the bubble creating unit 12 by referring to a bubble creation program stored (installed) in the storage unit (a storage medium or a storage device) and executing the program.

The calculation formula specifying unit 11 has a function of specifying one or more calculation formulas. The bubble creating unit 12 has a function of creating a bubble having an appearance defined by a specified calculation formula.

Figure 3:
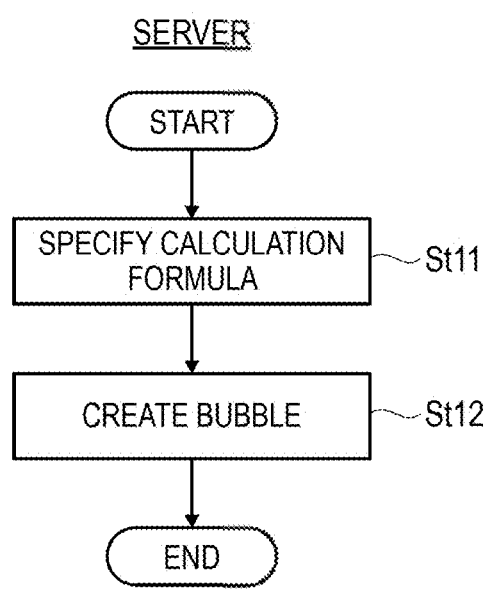
FIG. 3 is a flowchart showing an example of a bubble creation processing according to at least one of the embodiments of the present disclosure.

Next, a program execution processing according to the first embodiment of the present disclosure will be described. FIG. 3 is a flowchart showing an example of a bubble creation processing according to at least one of the embodiments of the present disclosure.

The calculation formula specifying unit 11 specifies one or more calculation formulas (St11). Next, the bubble creating unit 12 creates a bubble having an appearance defined by the specified calculation formula (St12).

The calculation formula refers to a combination of a number, an operator, a function, and the like based on a certain rule. The certain rule is, for example, a rule in which two operators "+" indicating division are not continuously arranged, such as "++". A specific example of the calculation formula will be described later with reference to FIGS. 14 and 15.

The bubble refers to a frame image surrounding a text, a pictogram, a stamp image, or the like. For example, a line (utterance content) or a thought (thought in the head) of a speaker is drawn in the bubble. The speaker includes, for example, a character who appears in a story such as a comic or a novel, a storyteller, a character who appears in a game, a game system that performs narration in a game, a person who sends texts indicating an utterance content in a character chat application, a performer of a TV program or a radio program, a performer and a participant of an event in a talk event or the like, a speaker who speaks in a video posted on a video posting site or a live distribution video (for example, a commentator of a live game video), and the like. Elements other than a character string may be drawn in the bubble (frame image). For example, a pictogram, a stamp image, a face image (a static image or a video) of a character, or the like may be drawn in a bubble. A frame of the bubble may not be completely closed, and a part of the text, the pictogram, the stamp image, or the like may protrude from the frame of the bubble.

An appearance of the bubble refers to a shape, a color, a size, a pattern, a texture, and the like of a displayed bubble. The appearance includes at least a shape.

According to an aspect of the first embodiment, since various types of calculation formulas can be defined, various bubbles can be provided.

According to an aspect of the first embodiment, since various bubbles are provided, a performance effect presented to a user who sees the displayed bubble can be improved.

According to an aspect of the first embodiment, since various bubbles are provided, the interest of a player in a video game in which the bubbles are displayed can be improved.

Second Embodiment

A summary of a second embodiment of the present disclosure will be described. Hereinafter, a bubble creation program executed in a server will be described as an example of the second embodiment. The server may be the server 10 provided in the video game processing system 100 shown in FIG. 1.

Figure 4:
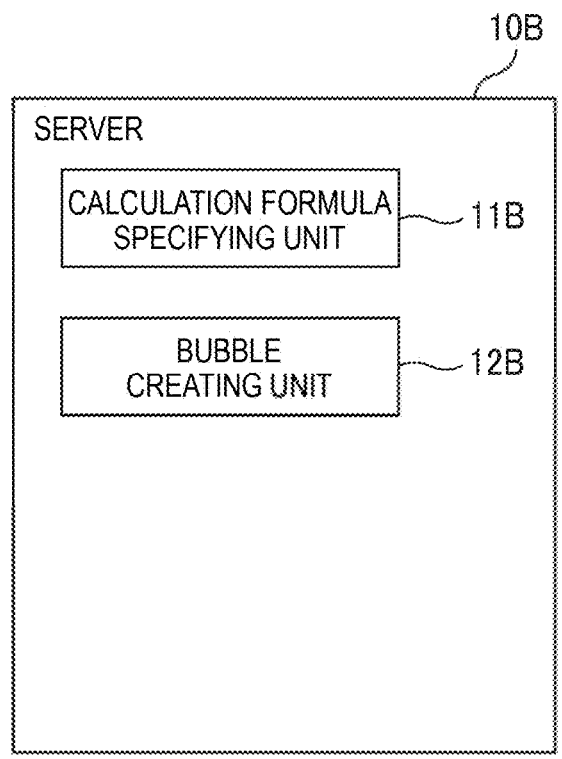
FIG. 4 is a block diagram showing a configuration of a server according to at least one of the embodiments of the present disclosure.

FIG. 4 is a block diagram showing a configuration of a server according to at least one of the embodiments of the present disclosure. A server 10B that is a configuration example of the server 10 includes at least a calculation formula specifying unit 11B and a bubble creating unit 12B. A processor provided in the server 10B functionally implements the calculation formula specifying unit 11B and the bubble creating unit 12B by referring to a bubble creation program stored (installed) in a storage unit (a storage medium or a storage device) and executing the program.

The calculation formula specifying unit 11B has a function of specifying one or more calculation formulas having a variable. The bubble creating unit 12B has a function of creating a bubble having an appearance defined by a specified calculation formula. The appearance of the bubble created by the bubble creating unit 12B changes in accordance with a change of a value of the variable.

Figure 5:
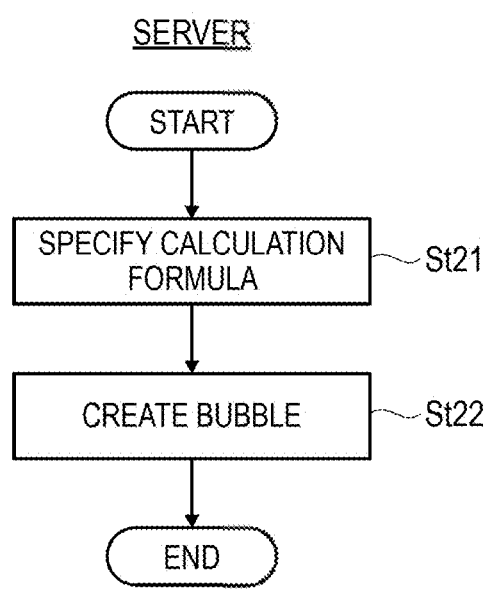
FIG. 5 is a flowchart showing an example of a bubble creation processing according to at least one of the embodiments of the present disclosure.

Next, a program execution processing according to the second embodiment of the present disclosure will be described. FIG. 5 is a flowchart showing an example of a bubble creation processing according to at least one of the embodiments of the present disclosure.

The calculation formula specifying unit 11B specifies one or more calculation formulas (St21). Next, the bubble creating unit 12B creates a bubble having an appearance defined by the specified calculation formula (St22).

Similar to the calculation formula in the first embodiment, the calculation formula in the second embodiment refers to a combination of a number, an operator, a function, and the like based on a certain rule. Here, the calculation formula in the second embodiment has a variable. The variable is a number of variable values. When the value of the variable changes, a calculation result of the calculation formula changes. Since the appearance of the bubble is defined by the calculation formula, the appearance of the bubble also changes.

Since the meanings of the bubble and the appearance of the bubble in the second embodiment are the same as those in the first embodiment, description thereof will be omitted.

According to an aspect of the second embodiment, since the appearance of the bubble can be changed by changing the value of the variable, more various bubbles can be provided.

According to an aspect of the second embodiment, since the bubble can be displayed as an animation by changing the value of the variable, a performance effect presented to a user who sees the displayed bubble can be improved.

According to an aspect of the second embodiment, the interest of a player in a video game in which the bubbles are displayed can be further improved.

Third Embodiment

A summary of a third embodiment of the present disclosure will be described. Hereinafter, a bubble creation program executed in a server will be described as an example of the third embodiment. In the third embodiment, the server may be the server 10 provided in the video game processing system 100 shown in FIG. 1. A bubble is displayed on a game screen provided at the user terminal 20 side.

Figure 6:
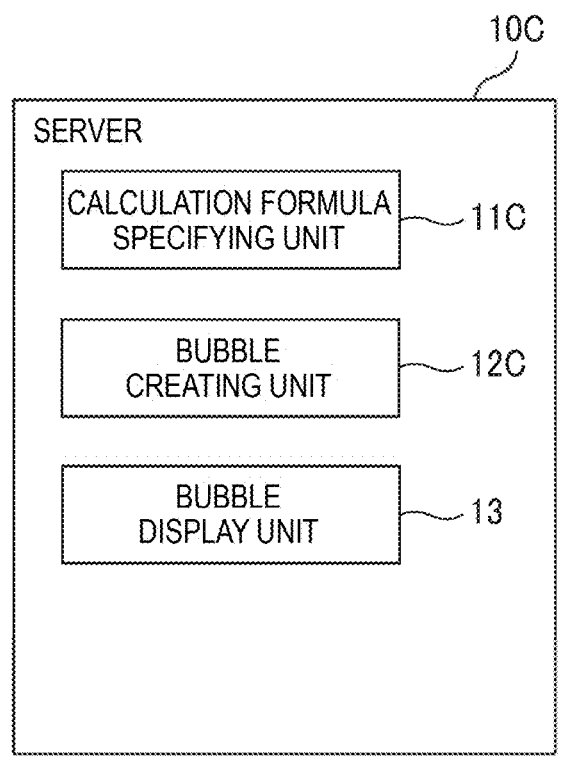
FIG. 6 is a block diagram showing a configuration of a server according to at least one of the embodiments of the present disclosure.

FIG. 6 is a block diagram showing a configuration of a server according to at least one of the embodiments of the present disclosure. A server 10C that is a configuration example of the server 10 includes at least a calculation formula specifying unit 11C, a bubble creating unit 12C, and a bubble display unit 13. A processor provided in the server 10C functionally implements the calculation formula specifying unit 11C, the bubble creating unit 12C, and the bubble display unit 13 by referring to a bubble creation program stored (installed) in a storage unit (a storage medium or a storage device) and executing the program.

The calculation formula specifying unit 11C has a function of specifying one or more calculation formulas. The bubble creating unit 12B has a function of creating a bubble having an appearance defined by a specified calculation formula. The bubble display unit 13 has a function of displaying the created bubble on a game screen.

Figure 7:
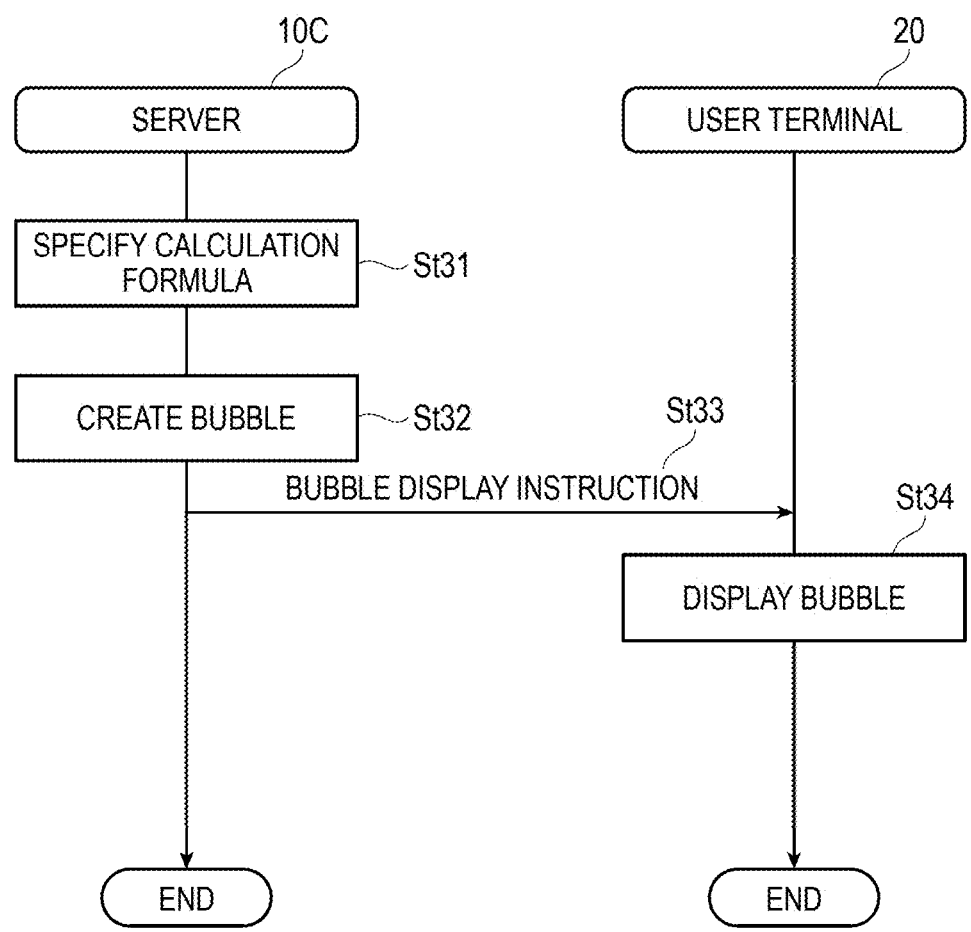
FIG. 7 is a sequence diagram showing an example of a game processing according to at least one of the embodiments of the present disclosure.

Next, a program execution processing according to the third embodiment of the present disclosure will be described. FIG. 7 is a sequence diagram showing an example of a game processing according to at least one of the embodiments of the present disclosure.

The calculation formula specifying unit 11C specifies one or more calculation formulas (St31). Next, the bubble creating unit 12C creates a bubble having an appearance defined by the specified calculation formula (St32). Next, the bubble display unit 13 transmits a bubble display instruction to the user terminal 20 in order to display the created bubble on a game screen (St33). The bubble display instruction may include image data of the created bubble. Next, the user terminal 20 that received the bubble display instruction displays the bubble on the game screen (St34).

Since the meanings of the calculation formula, the bubble, and the appearance of the bubble in the third embodiment are the same as those in the first embodiment or the second embodiment, description thereof will be omitted.

According to an aspect of the third embodiment, the user can recognize various bubbles.

According to an aspect of the third embodiment, the user can recognize a bubble with an improved performance effect.

According to an aspect of the third embodiment, the interest of a video game player can be attracted by the bubble.

Fourth Embodiment

A summary of a fourth embodiment of the present disclosure will be described. Hereinafter, a video game processing system that controls the progress of a video game will be described as an example of a fourth embodiment.

Figure 8:
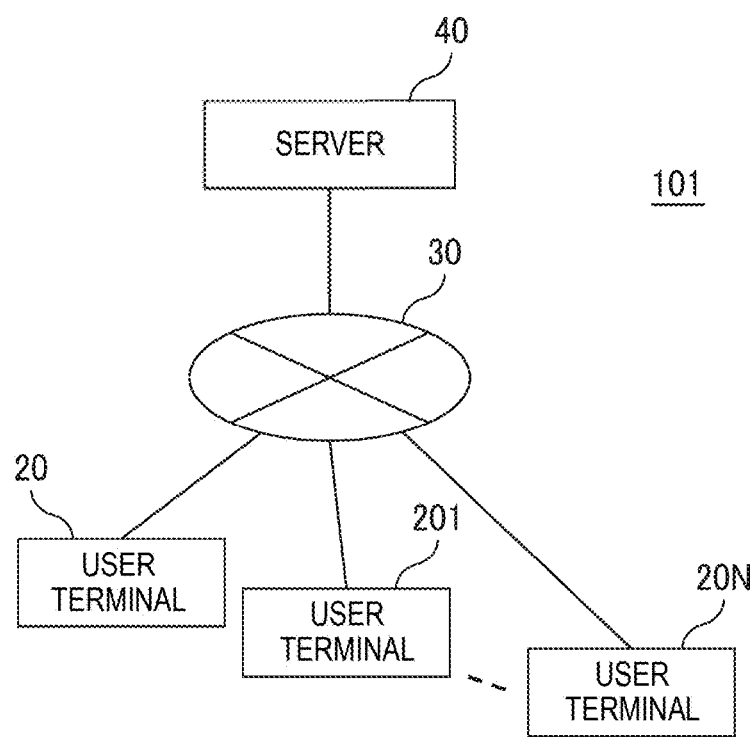
FIG. 8 is a block diagram showing a configuration example of a video game processing system according to at least one of the embodiments of the present disclosure.

FIG. 8 is a block diagram showing a configuration example of a video game processing system according to at least one of the embodiments of the present disclosure. A video game processing system 101 includes a video game processing server 40 (server 40) and user terminals 20 and 201 to 20N (N is an integer that can be freely set) used by a user (game player or the like) of the video game processing system 101. A configuration of the video game processing system 101 is not limited thereto. For example, the video game processing system 101 may have a configuration in which a single user terminal is used by a plurality of users. The video game processing system 101 may include a plurality of servers.

The server 40 and the plurality of user terminals 20 and 201 to 20N are communicably connected to the communication network 30 such as the Internet. The connection between the communication network 30 and the server 40 and the connection between the communication network 30 and the plurality of user terminals 20 and 201 to 20N may be a wired connection or a wireless connection. For example, the plurality of user terminals 20 and 201 to 20N may be connected to the communication network 30 by performing, via a wireless communication line, data communication with a base station managed by a communication service provider.

The video game processing system 101 includes the server 40 and the plurality of user terminals 20 and 201 to 20N so as to achieve various functions for executing various processing in accordance with an operation of the user.

The server 40 controls the progress of a video game. The server 40 is managed by an administrator of the video game processing system 101, and has various functions for providing information related to various processing to the plurality of user terminals 20 and 201 to 20N. In the present example, the server 40 is configured by an information processing device such as a WWW server, and includes a storage unit (a storage medium or a storage device) that stores various kinds of information. The server 40 has a general configuration serving as a computer for executing various processing, such as a control unit and a communication unit, and description thereof will be omitted here. In the video game processing system 101, it is preferable that the server 40 manages various kinds of information from the viewpoint of reducing a processing load on each of the plurality of user terminals 20 and 201 to 20N. The storage unit that stores various kinds of information may be provided with a storage area in a state in which the storage area can be accessed by the server 40, and may be provided with, for example, a dedicated storage area outside the server 40.

Each of the plurality of user terminals 20 and 201 to 20N is managed by a user, and is configured by a communication terminal that can be used to play a network distribution type game. Examples of the communication terminal that can be used to play a network distribution type game include a mobile phone terminal, a personal digital assistant (PDA), a portable game device, VR goggles, a so-called wearable device, and the like. A configuration of a user terminal that can be provided in the video game processing system 101 is not limited thereto, and may be any configuration as long as a user can recognize a composite image. Other examples of the configuration of the user terminal include a combination of various communication terminals, a personal computer, and a stationary game device.

Each of the plurality of user terminals 20 and 201 to 20N is connected to the communication network 30 and includes hardware (for example, a display device that displays a browser screen or a game screen according to coordinates) and software that are used to execute various processing by communicating with the server 40. Each of the plurality of user terminals 20 and 201 to 20N may be configured to be able to directly communicate with one another without communicating with one another via the server 40.

Each of the plurality of user terminals 20 and 201 to 20N may have a built-in display device. A display device may be connected to each of the user terminals 20 and 201 to 20N in a wireless or wired manner. Since the display device has a very general configuration, description thereof is omitted here. A game screen is displayed on the display device as, for example, the composite image described above, and a user recognizes the composite image. For example, the game screen is displayed on a display that is an example of a display device provided in the user terminal or a display that is an example of a display device connected to the user terminal. Examples of the display device include a hologram display device that can perform a hologram display and a projection device that projects an image (including a game screen) onto a screen or the like.

Figure 9:
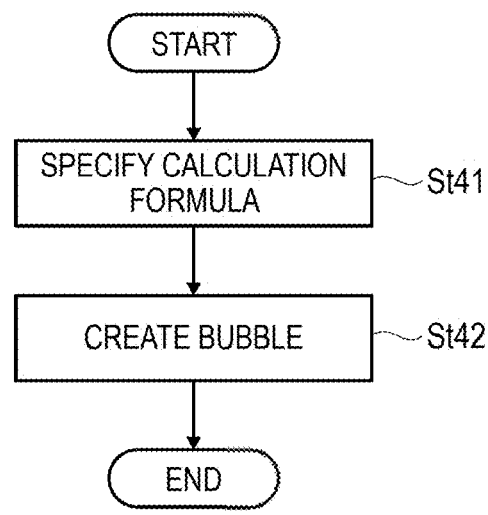
FIG. 9 is a flowchart showing an example of a bubble creation processing according to at least one of the embodiments of the present disclosure.

Next, a program execution processing according to the fourth embodiment of the present disclosure will be described. FIG. 9 is a flowchart showing an example of a bubble creation processing according to at least one of the embodiments of the present disclosure.

The video game processing system 101 specifies one or more calculation formulas (St41). Next, the video game processing system 101 creates a bubble having an appearance defined by the specified calculation formula (St42).

A processing subject in step St41 may be the server 40 or any one of the plurality of user terminals 20 and 201 to 20N. For example, when a calculation formula is specified based on information stored in the server 40, the server 40 may execute the step St41. Conversely, when a calculation formula is specified based on information stored in any one of the plurality of user terminals 20 and 201 to 20N, any one of the user terminals 20 and 201 to 20N may execute the step St41.

A processing subject in step St42 may be the server 40 or any one of the plurality of user terminals 20 and 201 to 20N. For example, the server 40 may execute the step St42 from the viewpoint of a processing load. Alternatively, the user terminal may execute the step St42 from the viewpoint of reducing a communication load when a bubble image is transmitted from the server 40 to any one of the plurality of user terminals 20 and 201 to 20N.

Since the meanings of the calculation formula, the bubble, and the appearance of the bubble in the fourth embodiment are the same as those in the first embodiment to the third embodiment, description thereof will be omitted.

According to an aspect of the fourth embodiment, since various types of calculation formulas can be defined, various bubbles can be provided.

According to an aspect of the fourth embodiment, since various bubbles are provided, a performance effect presented to a user who sees the displayed bubble can be improved.

According to an aspect of the fourth embodiment, since various bubbles are provided, the interest of a player in a video game in which the bubbles are displayed can be improved.

Fifth Embodiment

Figure 10:
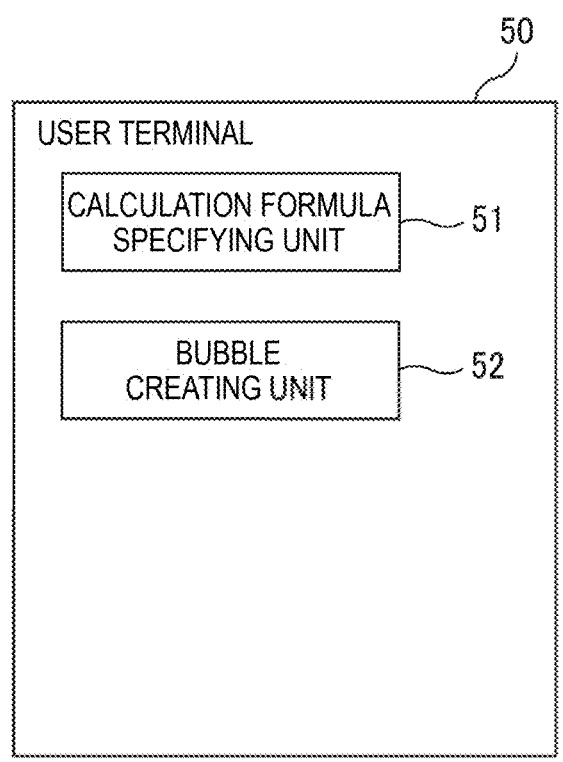
FIG. 10 is a block diagram showing a configuration of a user terminal according to at least one of the embodiments of the present disclosure.

A summary of a fifth embodiment of the present disclosure will be described. Hereinafter, a bubble creation program executed in a user terminal will be described as an example of the fifth embodiment, FIG. 10 is a block diagram showing a configuration of a user terminal according to at least one of the embodiments of the present disclosure.

The user terminal 50 is managed by a user, and is configured by a terminal that can be used by a user to play a game. The game played using the user terminal 50 may be a network distribution type game or a stand-alone type game. The user terminal 50 may control the progress of the video game. The user terminal 50 has a general configuration serving as a computer device for performing various processing, such as a control unit, a storage unit, a communication unit, and an input unit, and description thereof will be omitted here.

Examples of the user terminal 50 include a mobile phone terminal, a personal digital assistant (PDA), a portable game device, VR goggles, a so-called wearable device, and the like. A configuration of the user terminal 50 is not limited thereto, and may be any configuration as long as a user can recognize a composite image. Other examples of the configuration of the user terminal 50 include a combination of various communication terminals, a personal computer, and a stationary game device.

The user terminal 50 may be any one of the plurality of user terminals 20 and 201 to 20N shown in FIG. 1 or FIG. 8.

The user terminal 50 includes at least a calculation formula specifying unit 51 and a bubble creating unit 52. A control unit (processor) provided in the user terminal 50 functionally implements the calculation formula specifying unit 51 and the bubble creating unit 52 by referring to a bubble creation program stored (installed) in the storage unit (a storage medium or a storage device) or transmitted to the server 40 and executing the program.

The calculation formula specifying unit 51 has a function of specifying one or more calculation formulas. The bubble creating unit 52 has a function of creating a bubble having an appearance defined by the specified calculation formula.

The user terminal 50 is combined with a display device. Since the display device has a very general configuration, description thereof is omitted here. The display device may be built in the user terminal 50 or may not be built in the user terminal 50. The display device may be connected to the user terminal 50 by wireless or wire. A game screen is displayed on the display device as, for example, the composite image described above, and a user recognizes the composite image. For example, the game screen is displayed on a display that is an example of a display device provided in the user terminal or a display that is an example of a display device connected to the user terminal. Examples of the display device include a hologram display device that can perform a hologram display and a projection device that projects an image (including a game screen) onto a screen or the like.

Figure 11:
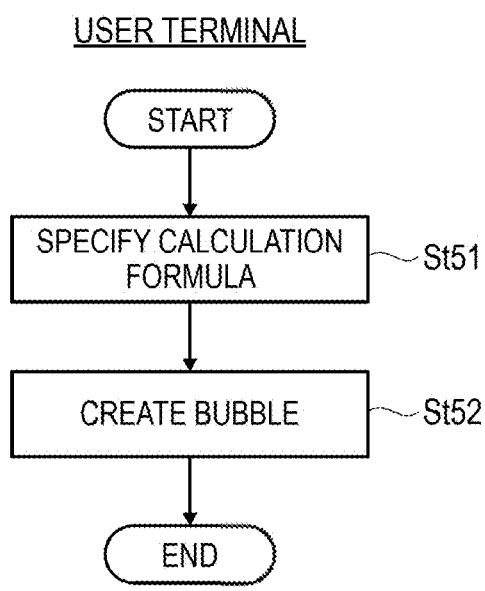
FIG. 11 is a flowchart showing an example of a bubble creation processing according to at least one of the embodiments of the present disclosure.
Figure 12:
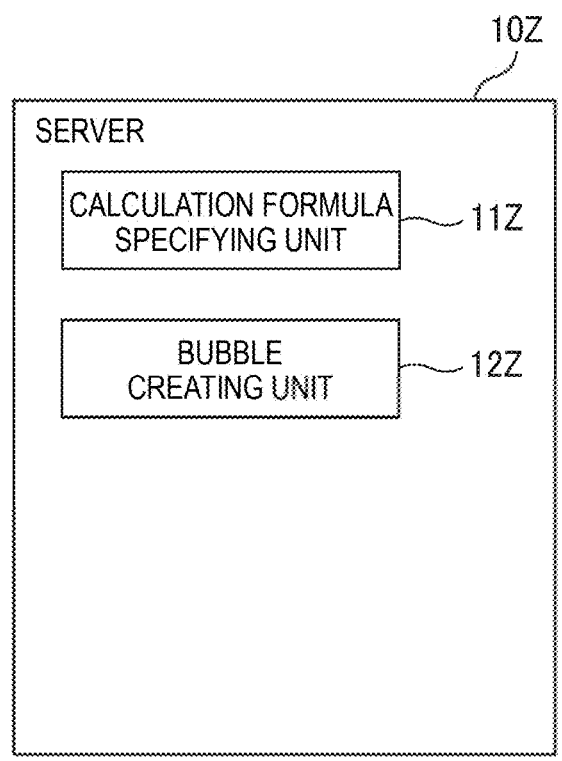
FIG. 12 is a block diagram showing a configuration of a server according to at least one of the embodiments of the present disclosure.

FIG. 11 is a flowchart showing a program execution processing according to the fifth embodiment of the present disclosure and showing an example of a bubble creation processing according to at least one of the embodiments of the present disclosure.

The calculation formula specifying unit 51 specifies one or more calculation formulas (St51). Next, the bubble creating unit 52 creates a bubble having an appearance defined by the specified calculation formula (St52).

Since the meanings of the calculation formula, the bubble, and the appearance of the bubble in the fifth embodiment are the same as those in the first embodiment to the fourth embodiment, description thereof will be omitted.

According to an aspect of the fifth embodiment, since various types of calculation formulas can be defined, various bubbles can be provided.

According to an aspect of the fifth embodiment, since various bubbles are provided, a performance effect presented to a user who sees the displayed bubble can be improved.

According to an aspect of the fifth embodiment, since various bubbles are provided, the interest of a player in a video game in which the bubbles are displayed can be improved.

Sixth Embodiment

A summary of a sixth embodiment of the present disclosure will be described. Hereinafter, a bubble creation program executed in a server will be described as an example of the sixth embodiment.

12 is a block diagram showing a configuration of a server according to at least one of the embodiments of the present disclosure. A server 10Z that is a configuration example of the server 10 includes at least a calculation formula specifying unit 11Z and a bubble creating unit 12Z. A processor provided in the server 10Z functionally implements the calculation formula specifying unit 11Z and the bubble creating unit 12Z by referring to a bubble creation program stored (installed) in a storage unit (a storage medium or a storage device) and executing the program.

The calculation formula specifying unit 11Z has a function of specifying one or more calculation formulas. The bubble creating unit 12Z has a function of creating a bubble having an appearance defined by the specified calculation formula.

Figure 13:
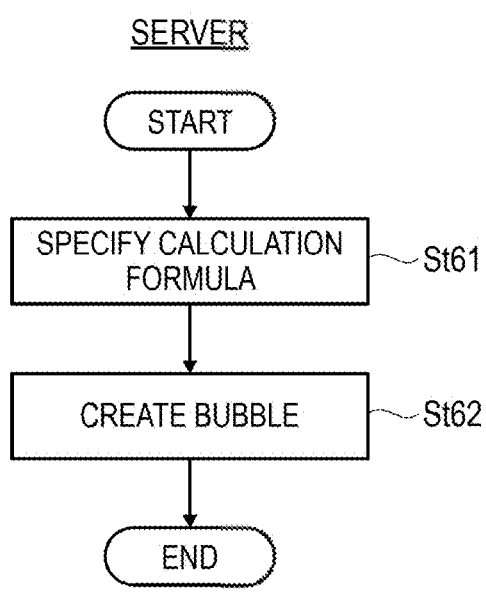
FIG. 13 is a flowchart showing an example of a bubble creation processing according to at least one of the embodiments of the present disclosure.

Next, a program execution processing according to the sixth embodiment of the present disclosure will be described. FIG. 13 is a flowchart showing an example of a bubble creation processing according to at least one of the embodiments of the present disclosure.

The calculation formula specifying unit 11Z specifies one or more calculation formulas (St61). Next, the bubble creating unit 12Z creates a bubble having an appearance defined by the specified calculation formula (St62).

The calculation formula refers to a combination of a number, an operator, a function, and the like based on a certain rule. The certain rule is, for example, a rule in which two operators "+" indicating division are not continuously arranged, such as "++" A specific example of the calculation formula will be described later with reference to FIGS. 14 and 15.

The bubble refers to a frame image surrounding a text, a pictogram, a stamp image, or the like. For example, a line (utterance content) or a thought (thought in the head) of a speaker is drawn in the bubble. The speaker includes, for example, a character who appears in a story such as a comic or a novel, a storyteller, a character who appears in a game, a game system that performs narration in a game, a person who sends texts indicating an utterance content in a character chat application, a performer of a TV program or a radio program, a performer and a participant of an event in a talk event or the like, a speaker who speaks in a video posted on a video posting site or a live distribution video (for example, a commentator of a live game video), and the like. Elements other than a character string may be drawn in the bubble (frame image). For example, a pictogram, a stamp image, a face image (a static image or a video) of a character, or the like may be drawn in a bubble. A frame of the bubble may not be completely closed, and a part of the text, the pictogram, the stamp image, or the like may protrude from the frame of the bubble.

The appearance of the bubble refers to a shape, a color, a size, a pattern, a texture, and the like of a displayed bubble. The appearance includes at least a shape.

Figure 14:
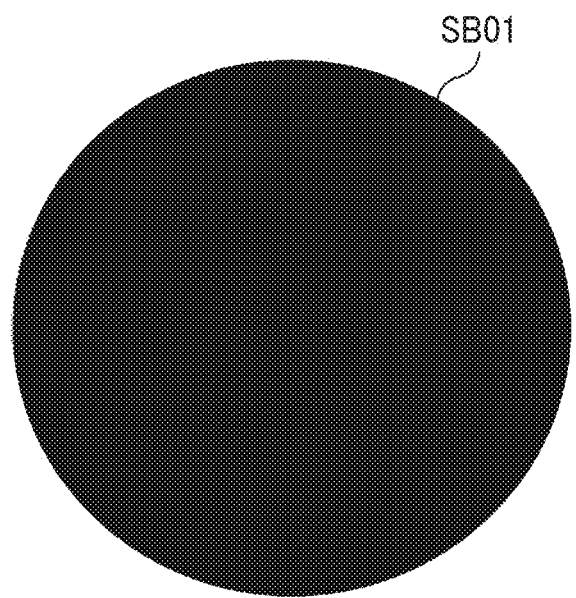
FIG. 14 is a diagram showing an example of a bubble having an appearance defined by a calculation formula according to at least one of the embodiments of the present disclosure.

FIG. 14 is a diagram showing an example of a bubble having an appearance defined by a calculation formula according to at least one of the embodiments of the present disclosure.

A bubble SB01 has a circular appearance. Although the bubble SB01 is drawn in black in the drawing, the bubble SB01 can be drawn in various colors other than black in practice. In step St61, the calculation formula specifying unit 11Z can specify a calculation formula A that defines an appearance of the bubble SB01.

The calculation formula A is defined as length(p)−r. Here, p refers to a point in a two-dimensional coordinate system (an XY coordinate system in the present example). The length(p) refers to a function that outputs a distance (length) from an origin to the point p in the coordinate system. The function length(p) can be expressed by the following calculation formula in which a value of an x coordinate of the point p is p.x and a value of a y coordinate of the point p is p.y.

$$\text{length}(p) = ((p \cdot x)^2 + (p \cdot y)^2)^{1/2}$$

The calculation formula A includes 'r' that represents a radius of a circle. The radius 'r' of the circle may be a fixed value. The radius r of the circle may be a number (variable) whose value changes.

The calculation formula A specified in step St61 defines an appearance of the bubble SB01. In fact, when the distance from the origin to the point p is equal to or less than r, a calculation result of the calculation formula A is a value of C or less. The bubble SB01 having a black circular shape is defined by drawing each point (each pixel on a displayed image) at which the calculation result of the calculation formula A is a value of 0 or less in black. In step St62, the bubble creating unit 12Z creates an image of the bubble SB01 based on the specified calculation formula A.

Figure 15:
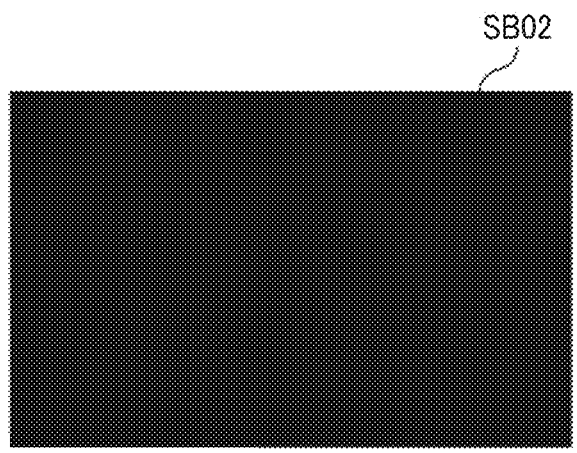
FIG. 15 is a diagram showing an example of a bubble having an appearance defined by a calculation formula according to at least one of the embodiments of the present disclosure.

FIG. 15 is a diagram showing an example of a bubble having an appearance defined by a calculation formula according to at least one of the embodiments of the present disclosure.

A bubble SB02 has a rectangular appearance. Although the bubble SB02 is drawn in black in the drawing, the bubble SB02 can be drawn in various colors other than black in practice. In step St61, the calculation formula specifying unit 11Z can specify a calculation formula B that defines an appearance of the bubble SB02.

The calculation formula B is defined as max(abs(p.x)-size.x, abs(p.y)-size.y). Here, p refers to a point in a two-dimensional coordinate system (an XY coordinate system in the present example). Furthermore, p.x represents a value of an x coordinate of the point p, and p.y refers to a value of a y coordinate of the point p.

Here, a function max(a, b) outputs a larger value between a value 'a' and a value 'b'. A function abs(X) outputs an absolute value of a value X. A function abs(X) can also be expressed as |X|.

Here, size.x represents a half of a length of the rectangle in an X axis direction. Furthermore, size.y represents a half of a length of the rectangle in a Y axis direction. Each of the size.x and the size.y may be a fixed value in the calculation formula B. Alternatively, each of the size.x and the size.y may be a number (variable) whose value changes.

The calculation formula B specified in step St61 defines an appearance of the bubble SB02. In fact, when the point p is a point inside the rectangle, a calculation result of the calculation formula B is a value of 0 or less. The bubble SB02 having a black rectangular shape is defined by drawing each point (each pixel on a displayed image) at which the calculation result of the calculation formula B is a value of 0 or less in black. In step St62, the bubble creating unit 12Z creates an image of the bubble SB02 based on the specified calculation formula B.

Figure 16:
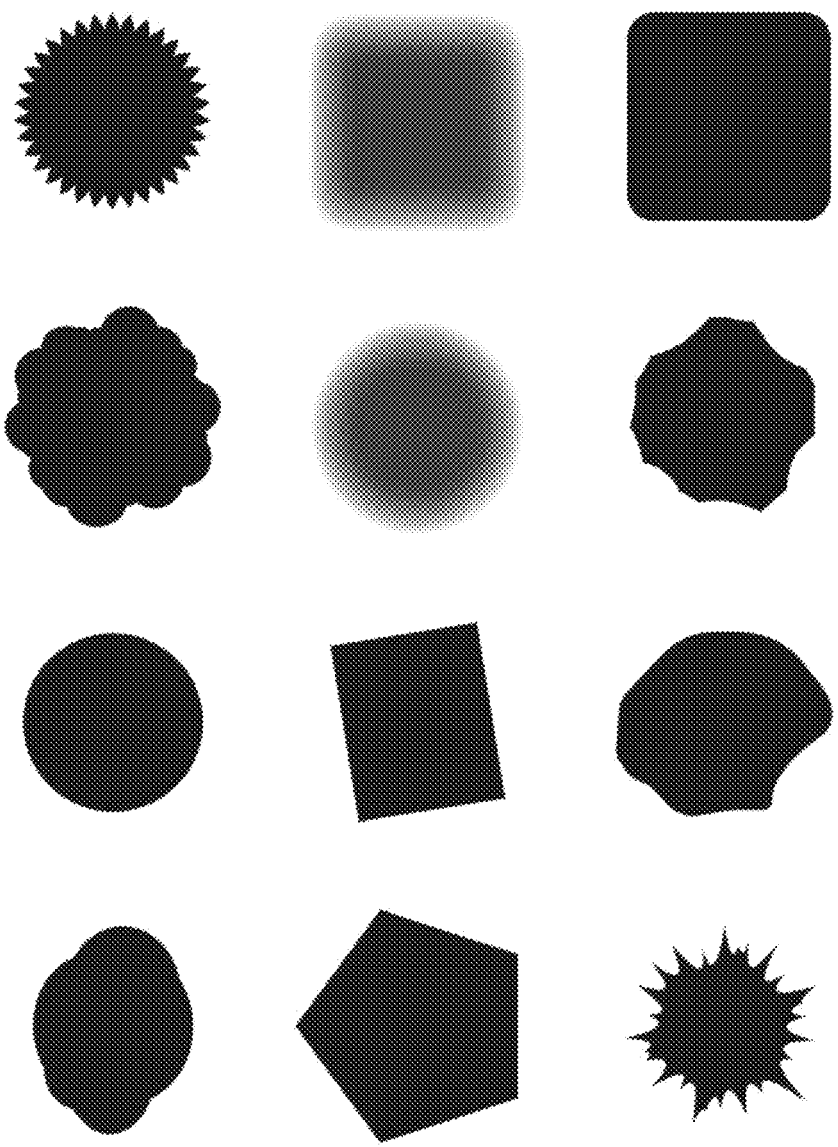
FIG. 16 is a diagram showing an example of a bubble having an appearance defined by a calculation formula according to at least one of the embodiments of the present disclosure.

FIG. 16 is a diagram showing an example of a bubble having an appearance defined by a calculation formula according to at least one of the embodiments of the present disclosure.

FIG. 16 shows bubbles having various appearances. Detailed description of calculation formulas that define the bubbles is omitted, and bubbles having such appearances or the like can be defined by calculation formulas. An appearance of a bubble may be obtained by combining a plurality of calculation formulas. In step St61, the calculation formula specifying unit 11Z can specify various calculation formulas that define an appearance of a bubble. In step St62, the bubble creating unit 12Z creates an image of a bubble based on the specified calculation formulas.

A color, a size, a pattern, a texture, and the like of a bubble can also be defined by a calculation formula. For example, when RGB values (values of R, G, and B are 0 to 255, respectively) based on additive color mixing are used to express colors, the value of R can be expressed by a calculation formula. The pattern can be expressed by a calculation formula in a similar manner to the shape. The size can be expressed by a calculation formula as indicated by the radius r shown in FIG. 14. Regarding the texture, for example, transparency (for example, an alpha value) of a bubble can be expressed by a calculation formula. The calculation formula specifying unit 11Z specifies calculation formulas that define colors, sizes, patterns, texture, and the like of the bubbles in addition to the shapes of the bubbles. The bubble creating unit 12Z creates images of the bubbles having the colors, the sizes, the patterns, the textures, and the like of the bubbles defined by the specified calculation formulas. The bubble creating unit 12Z can also create a bubble having any appearance as long as the appearance can be expressed by a calculation formula. Therefore, it is possible to present various kinds of performances depending on a shape, a color, and the like of a bubble.

A bubble image in the sixth embodiment is dynamically created by calculation based on a calculation formula. Therefore, the bubble image does not need to be statically stored as an asset (material) in a storage unit (a storage medium or a storage device). Therefore, the bubble image in the sixth embodiment does not compress a storage area. On the other hand, in the case of a bubble image stored in a storage unit (a storage medium or a storage device) as a static asset (material), many kinds of image data are stored. In particular, when a bubble is to be displayed as an animation, a large number of sequential images for forming the animation are stored in the storage unit (a storage medium or a storage device). Such a static asset has a large amount of data and compresses a storage area.

Here, dynamic creation of a bubble image refers to that the bubble image is not statically stored in a storage unit (a storage medium or a storage device) and is created by calculation each time. However, a part of the dynamically created bubble image may be stored in a storage unit (a storage medium or a storage device) and reused depending on a situation.

A bubble image may be created using a shader that performs shading processing in a non-limiting manner. A bubble image may be created without using a shader. A processor used for creating a bubble image may be a GPU, a CPU, or another computing device (for example, an FPGA). A bubble image may be created as a two-dimensional (2D) image, or may be created as a three-dimensional (3D) image. After a bubble image is created as a three-dimensional (3D) image, the bubble image may be projected onto a two-dimensional space to create a two-dimensional (2D) bubble image.

A bubble image in the sixth embodiment is not affected by enlargement or reduction of a display size, and image quality can be ensured. For example, in the case of the bubble SB01 in FIG. 14, when the value of r in the calculation formula A is increased, the bubble creating unit 12Z creates a bubble having a larger circular shape. When the value of r in the calculation formula A is reduced, the bubble creating unit 12Z creates a bubble having a smaller circular shape. In the case of the bubble SB02 in FIG. 15, when the value of size.x or size.y in the calculation formula B is increased, the bubble creating unit 12Z creates a bubble having a larger rectangular shape. When the value of size.x or size.y in the calculation formula B is reduced, the bubble creating unit 12Z creates a bubble having a smaller rectangular shape. Here, in the case of a bubble image stored in a storage area as a static asset (material), when the bubble image is enlarged to a size equal to or larger than resolution of the bubble image, image quality deteriorates.

FIG. 17 is a diagram showing examples of calculation formulas defined for creating bubbles according to at least one of the embodiments of the present disclosure.

A calculation formula may be defined in advance in a bubble creation program or in a format that can be referred from the bubble creation program. FIG. 17 shows predefined calculation formulas from a calculation formula 001 to a calculation formula 013 as non-limiting examples. The predefined calculation formulas are not limited thereto.

A "basic shape" indicates an outer shape (for example, a circular shape, a rectangular shape, an elliptical shape, or the like) of a bubble corresponding to a calculation formula. A "variable 1" and a "variable 2" indicate content of a value that can be input as a variable of a calculation formula. Although the variable 1 and the variable 2 are described for the convenience of description, the number of variables of one calculation formula is not limited to 1 or 2. The number of variables of one calculation formula may be 0 or 3 or more, A "bubble appearance change" indicates a change of an appearance of a created bubble due to a change of a value of a variable (how an appearance of a bubble changes when a value of a variable changes).

(Animation Display)

When the calculation formula specifying unit 11Z specifies a calculation formula having a variable, an appearance of a bubble created by the bubble creating unit 12Z changes in accordance with a change of a value of the variable. That is, the bubble can be displayed by animation by changing the value of the variable. The bubble to be created may be updated at regular intervals. For example, the bubble may be updated for each frame. When a frame rate (fps) is 60, the bubble is updated 60 times per second. Those skilled in the art can freely design what kind of value is used as a variable and how the appearance of a bubble is changed in accordance with the variable. Therefore, a change in an appearance of a bubble defined by a calculation formula can be diversified.

When a bubble image is statically stored as an asset (material) in a storage unit (a storage medium or a storage device), there is a method in which affine transformation (rotation, enlargement or reduction, and movement) is performed on one static image that is the bubble image, and the static image is displayed by animation. In the case of this method, an essential shape of the bubble image does not change, and it is difficult to present various expressions. On the other hand, when an appearance of a bubble is defined by a calculation formula, various changes can be made to the bubble image by changing a value of a variable, an expression is diversified, and a range of the expression is increased.

Figure 18:
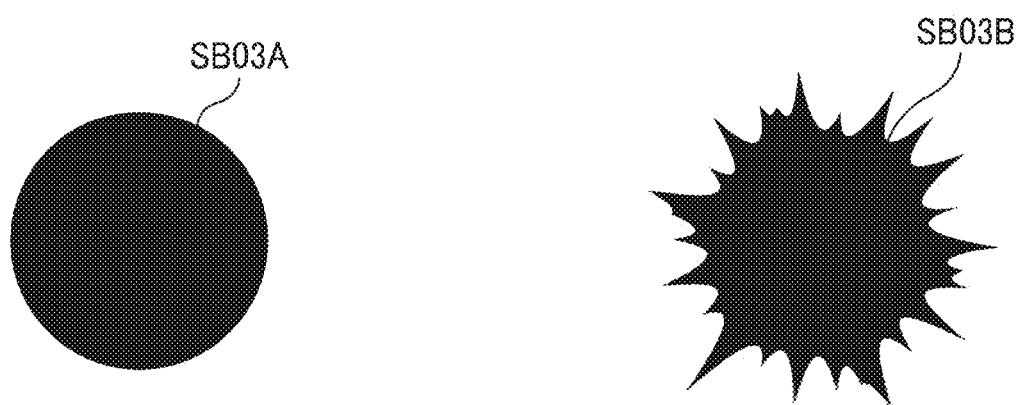
FIG. 18 is a diagram showing a change of a bubble corresponding to a variable according to at least one of the embodiments of the present disclosure.

FIG. 18 is a diagram showing a change of a bubble corresponding to a variable according to at least one of the embodiments of the present disclosure.

The calculation formula specifying unit 11Z specifies one or more calculation formulas based on a numerical value indicating content of a line combined with a bubble. Here, the term "line combined with a bubble" refers to a line that is displayed in a manner of overlapping a frame image when the frame image of the bubble is displayed on a game screen or the like, (Digitization of Emotion of Speaker Expressed by Line)

Content of a line may represent an emotion of a speaker in a non-limiting manner. For example, the calculation formula specifying unit 11Z specifies a calculation formula having a variable indicating an anger degree (anger level) expressed by a line. For example, when content of a line is "Autumn is cool and good", an anger level is 0. For example, when content of a line is "Don't be silly!!", an anger level is 3. The calculation formula specifying unit 11Z specifies the calculation formula 003 and the calculation formula 008 having a variable 1 indicating an "anger level (normal 0 to rage 10) based on content of a line" with reference to FIG. 17. FIG. 18 shows a bubble SB03A that has an appearance of a bubble created by the bubble creating unit 12Z when an anger level is 0. A bubble SB03B has an appearance of a bubble created by the bubble creating unit 12Z when an anger level is 6. An anger level of a speaker is indicated by a size of thorns provided at a bubble frame. Although the bubble is drawn in black in FIG. 18, the bubble SB03B is actually more reddish than the bubble SB03A (the calculation formula 008).

The calculation formula specifying unit 11Z may determine a value of an anger level based on content of a line according to various algorithms. For example, a storage unit (a storage medium or a storage device) of the server 10 stores in advance a correspondence table in which specific texts such as "Don't be silly", "Damn it", and "!" and a value of an anger level (an absolute value or an addition value) when such texts are included in a line are associated with each other. The calculation formula specifying unit 11Z calculates a value of an anger level based on the texts included in a line with reference to the correspondence table. The server 10 may include a learning model of machine learning. The learning model may be, for example, a learned model obtained by machine learning texts included in a line when the texts included in a line are input and a value of an anger level is output. The calculation formula specifying unit 11Z inputs the texts included in the line to the learned model, and calculates the value of the anger level. An anger level calculation algorithm is not limited to the one described above, and a person skilled in the art may appropriately determine a calculation algorithm. The calculation formula specifying unit 11Z may calculate a value of an anger level based on the texts included in the line by using any method that can be implemented by a person skilled in the art.

Content of a line combined with a bubble is not limited to an anger level. For example, the calculation formula specifying unit 11Z may determine various values such as an affection level, a tsundere level (hot and cold level), a dislike level, a curiosity level, a kindness level, a malice level, a sincerity level, a surprise level, a sadness level, and a superiority level, which are expressed by a line, based on texts included in the line. Then, the calculation formula specifying unit 11Z specifies a calculation formula having variables of these values.

(Digitization of Impression Given to Receiver Based on Line)

Content of a line may refer to an impression given to a person (a user, a viewer, a game player, and the like) who receives an utterance related to the line in a non-limiting manner. The impression is an emotion to a speaker possessed by a person (receiver) who received the utterance related to the line. For example, the receiver has an impression on the speaker, such as "this utterance is cute" or "this speaker has a strong feeling of responsibility". While the anger level described above refers to an emotion of a speaker, the impression refers to an emotion of a receiver. For example, the calculation formula specifying unit 11Z may determine values obtained by digitizing various impressions of a speaker such as a core strength level, a cuteness level, an honesty level, a responsibility strength, and a crazy level, which are given to the receiver from the line based on texts included in the line. An algorithm for determining a value obtained by digitizing the impression is the same as the algorithm described above with reference to the anger level. Then, the calculation formula specifying unit 11Z specifies a calculation formula having a variable of a value obtained by digitizing the impression.

(Digitization of Topic Included in Line)

Content of a line may refer to, in a non-limiting manner, a topic (utterance target) included in the line. For example, when a keyword such as "Aristotle" and "Kant" is included in a line, it is very likely that a speaker talks about philosophy. When a keyword such as "soft and creamy rice omelet" is included in a line, it is very likely that a speaker talks about food. In this case, the calculation formula specifying unit 11Z can digitize the line with reference to "topic difficulty". For example, the topic difficulty when a topic is food may be 1, and the topic difficulty when a topic is philosophy may be 5. An algorithm for determining a value obtained by digitizing a topic included in a line may be the same as that of the anger level as described above. Then, the calculation formula specifying unit 11Z specifies a calculation formula having a variable of a value obtained by digitizing a topic included in a line.

Alternatively, the calculation formula specifying unit 11Z may digitize content of a line based on various criteria. The calculation formula specifying unit 11Z specifies one or more calculation formulas based on a value obtained by digitizing the content of the line.

As described above, the calculation formula specifying unit 11Z specifies one or more calculation formulas based on a numerical value indicating content of a line combined with a bubble. Accordingly, the bubble creating unit 12Z can create a bubble having an appearance suitable for the content of the line combined with a bubble. Therefore, the interest of a player in a video game can be further improved.

FIG. 19 is a diagram showing a change of a bubble corresponding to a variable according to at least one of the embodiments of the present disclosure.

The calculation formula specifying unit 11Z specifies one or more calculation formulas based on the number of characters or words of a line combined with a bubble. Here, the term "line combined with a bubble" refers to a line that is displayed in a manner of overlapping a frame image when the frame image of the bubble is displayed on a game screen or the like.

For example, when content of a line is "We are looking for a legendary sword", the number of words is 7 (the number of characters including space is 36). When content of a line is "In a cave located beyond the northern mountain, the legendary sword may be sleeping", the number of words is 14 (the number of characters including space is 83). The calculation formula specifying unit 11Z specifies the calculation formula 002 having a variable 1 indicating "the number of characters or words of a line" with reference to FIG. 17. In FIG. 19, a bubble SB04A has an appearance of a bubble created by the bubble creating unit 12Z when the number of words is 7. A bubble SB04B has an appearance of a bubble created by the bubble creating unit 12Z when the number of words is 14. A bubble frame is enlarged in a vertical direction (a long axis direction of an ellipse) when the number of words are large.

As described above, the calculation formula specifying unit 11Z specifies one or more calculation formulas based on the number of characters or words of a line combined with a bubble. Accordingly, the bubble creating unit 12Z can create a bubble having an appearance suitable for the number of characters or words of a line combined with a bubble. Therefore, the interest of a player in a video game can be further improved.

Figure 20:
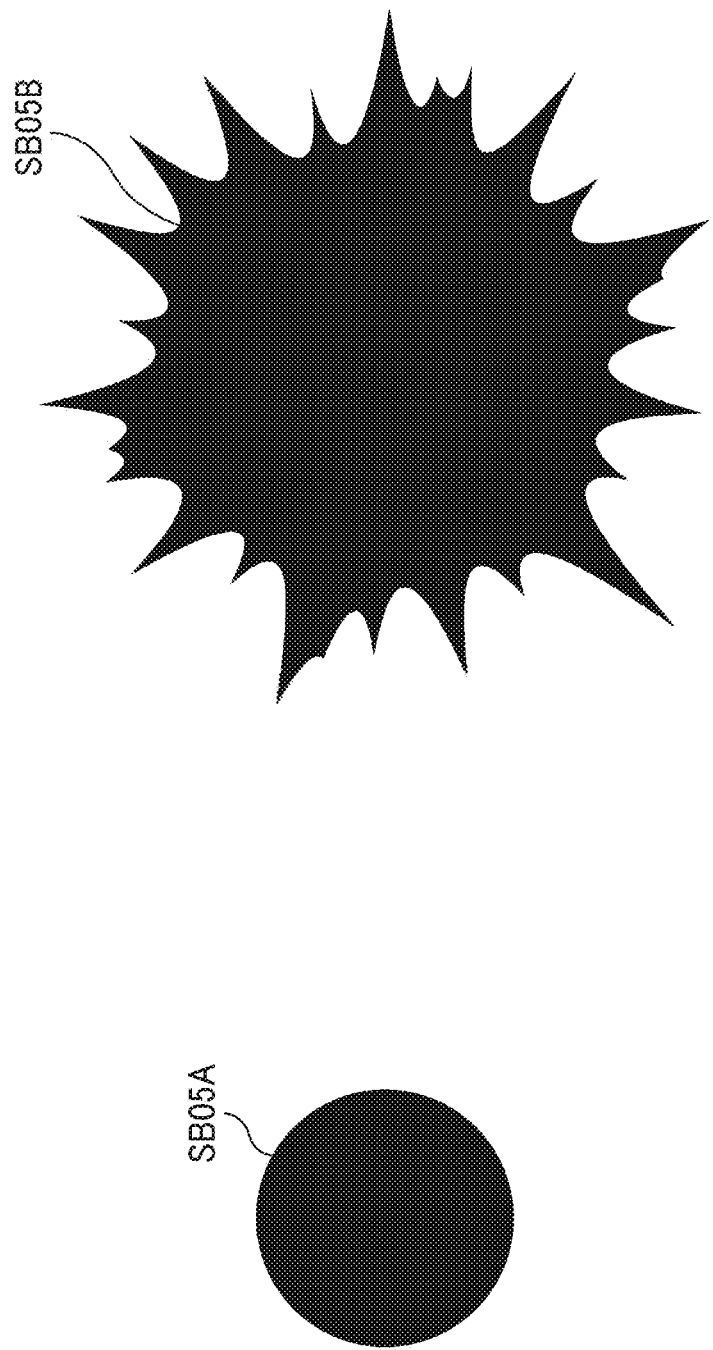
FIG. 20 is a diagram showing a change of a bubble corresponding to a variable according to at least one of the embodiments of the present disclosure.
Figure 21:
FIG. 21 is a diagram showing a change of a bubble corresponding to a variable according to at least one of the embodiments of the present disclosure.

FIGS. 20 and 21 are diagrams showing changes of bubbles corresponding to variables according to at least one of the embodiments of the present disclosure.

The calculation formula specifying unit 11Z specifies one or more calculation formulas based on a volume or voice quality of voice data corresponding to a line combined with a bubble. Here, the term "line combined with a bubble" refers to a line that is displayed in a manner of overlapping a frame image when the frame image of the bubble is displayed on a game screen or the like.

(Voice Data Corresponding to Line)

Voice data corresponding to a line refers to voice data reproduced together with a display when a bubble combined with a line is displayed. For example, in a video game or the like, voice data generated by a voice actor reading out a line may be reproduced together with a display of a bubble combined with the line. In a live video, a talk event, or the like, an utterance of a commentator or a performer is collected by a microphone and is recorded as voice data. The recorded voice data is reproduced together with a display of a bubble (such as a display in a live video and a display on a large screen in an event site or the like). The voice data is an example of data corresponding to a line.

The calculation formula specifying unit 11Z specifies a calculation formula having a variable indicating a volume of voice data corresponding to a line (hereinafter, simply referred to as a volume of a line). The calculation formula specifying unit 11Z specifies the calculation formula 009 having a variable 1 indicating "a volume of a line (1 to 20)" with reference to FIG. 17. In FIG. 20, a bubble SB05A has an appearance of a bubble created by the bubble creating unit 12Z when a volume of a line is 1. A bubble SB05B has an appearance of a bubble created by the bubble creating unit 12Z when a volume of a line is 18. When a voice of a speaker is loud, sizes of thorns provided at a bubble frame are large and a size of the bubble is large.

The calculation formula specifying unit 11Z specifies a calculation formula having a variable indicating voice quality of voice data corresponding to a line (hereinafter, simply referred to as voice quality of a line). Various criteria for digitizing voice quality can be considered, and breath leakage level of a voice actor is used here. A voice having a high breath leakage level (breathy voice) has a breath leakage level of 10 and a voice having a low breath leakage level has a breath leakage level of 1. An existing voice processing technique may be used for digitization (for example, calculation of a breath leakage level) based on voice data. The calculation formula specifying unit 11Z specifies the calculation formula 010 having a variable 1 indicating "voice quality of a line (breath leakage level of 1 to 10)" with reference to FIG. 17. In FIG. 21, a bubble SB06A has an appearance of a bubble created by the bubble creating unit 12Z when a breath leakage level is 1. A bubble SB06B has an appearance of a bubble created by the bubble creating unit 12Z when a breath leakage level is 5. A degree of blurring of an outer edge portion of the bubble SB06B is larger than that of the bubble SB06A. An amount of exhaled air in a voice is expressed as a degree of blurring of a bubble frame.

Voice quality of a line is not limited to the breath leakage level. For example, voice quality of a line includes a low voice of a speaker, a degree of an edged voice, a degree of a nasal voice, sound quality, tone, and the like. These types of voice quality of a line are digitized, and the calculation formula specifying unit 11Z specifies a calculation formula having a variable of digitized values.

As described above, the calculation formula specifying unit 11Z specifies one or more calculation formulas based on a volume or voice quality of voice data corresponding to a line combined with a bubble. Accordingly, the bubble creating unit 12Z can create a bubble having an appearance suitable for the volume or the voice quality of the voice data corresponding to a line. Therefore, the interest of a player in a video game can be further improved.

Figure 22:
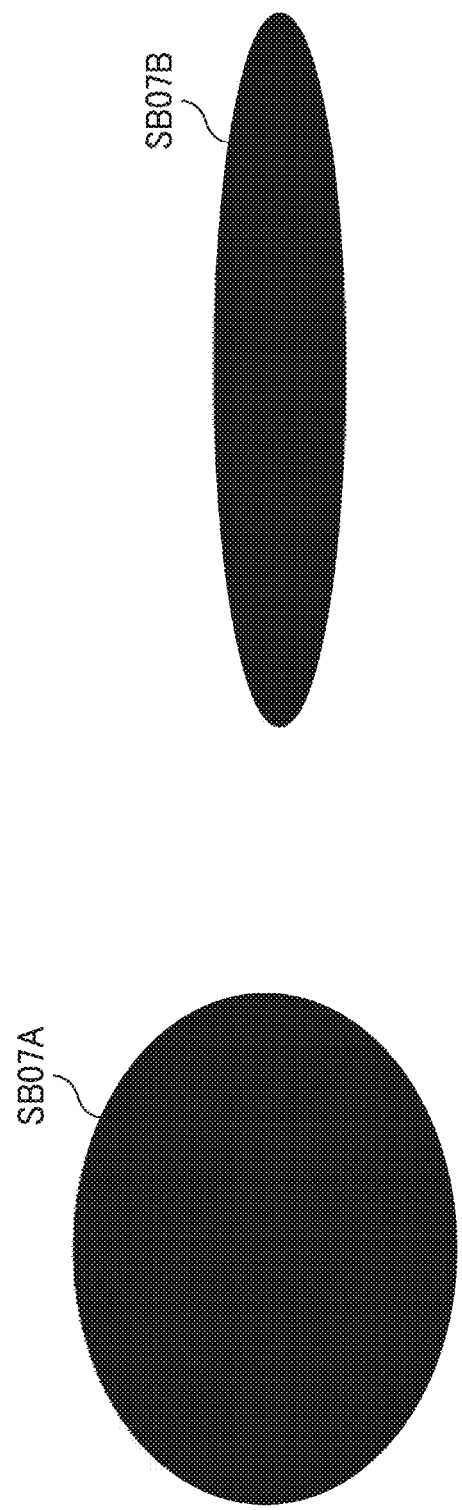
FIG. 22 is a diagram showing a change of a bubble corresponding to a variable according to at least one of the embodiments of the present disclosure.

FIG. 22 is a diagram showing a change of a bubble corresponding to a variable according to at least one of the embodiments of the present disclosure.

The calculation formula specifying unit 11Z specifies one or more calculation formulas based on an attribute value of a speaker of a line combined with a bubble. Here, the term "line combined with a bubble" refers to a line that is displayed in a manner of overlapping a frame image when the frame image of the bubble is displayed on a game screen or the like.

(Attribute (Value) of Speaker)

An attribute of a speaker refers to a property of the speaker. An attribute value of the speaker refers to digitization of the attribute of the speaker. For example, examples of an attribute of a speaker include sex, age, physical strength, intelligence, charm, agility, arm strength, wisdom, bravery, luck, recovery power, hit point (HP), magic point (MP), physical attack resistance, magic attack resistance, and the like of a character who appears in a story or a game. The attribute of a speaker is not limited thereto. Hereinafter, a case where the attribute of a speaker is a hit point (HP) of a character who appears in a game will be described.

The calculation formula specifying unit 11Z specifies a calculation formula having a variable indicating a hit point (HP) of a speaker of a line. The calculation formula specifying unit 11Z specifies the calculation formula 001 having a variable 1 indicating an "HP of a character" with reference to FIG. 17. In FIG. 22, a bubble SB07A has an appearance of a bubble created by bubble creating unit 12Z when an HP of a character is fairly high. A bubble SB07B has an appearance of a bubble created by the bubble creating unit 12Z when an HP of a character is low. Although a basic shape of a bubble in the present example is an elliptical shape, the ellipse extends in a major axis direction and contracts in a minor axis direction corresponding to a reduction in an HP of a character. That is, a bubble frame is crushed to be thin corresponding to the reduction of the HP of the character. Accordingly, a state indicating the character is weak is expressed.

In addition, the calculation formula specifying unit 11Z may specify one or more calculation formulas based on various attribute values of a speaker.

As described above, the calculation formula specifying unit 11Z specifies one or more calculation formulas based on an attribute value of a speaker of a line combined with a bubble. Accordingly, the bubble creating unit 12Z can create a bubble having an appearance suitable for an attribute of a speaker of a line combined with a bubble. Therefore, the interest of a player in a video game can be further improved.

Figure 23:
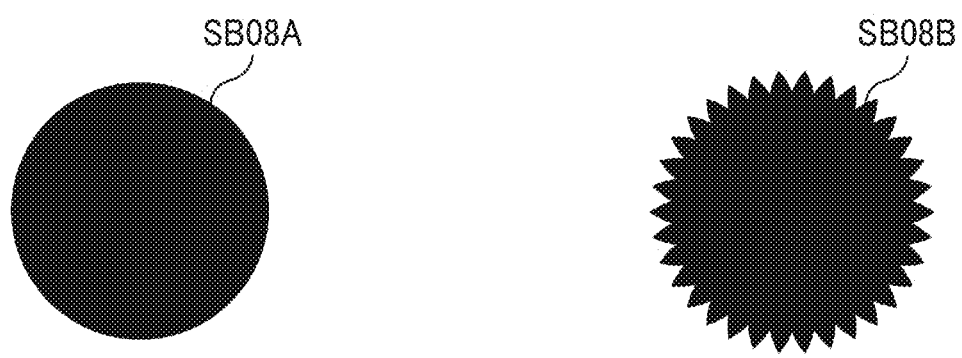
FIG. 23 is a diagram showing a change of a bubble corresponding to a variable according to at least one of the embodiments of the present disclosure.

FIG. 23 is a diagram showing a change of a bubble corresponding to a variable according to at least one of the embodiments of the present disclosure.

The calculation formula specifying unit 11Z specifies one or more calculation formulas based on a numerical value indicating an environment in which a speaker of a line combined with a bubble is present. Here, the term "line combined with a bubble" refers to a line that is displayed in a manner of overlapping a frame image when the frame image of the bubble is displayed on a game screen or the like.

(Environment in which Speaker is Present)

An environment in which a speaker is present refers to an environment around the speaker. For example, when the speaker is an in-game character that appears in a game, the environment in which the speaker is present includes the following environments such as a place where a character currently stays (a town, a village, a city, a dungeon, a cave, a shrine for recovering physical strength, a prairie, a mountain, sea, and the like), the number of partners or status of partners, whether a character encounters an enemy character, current time for a character (for example, morning, noon, sunset, night, midnight, and the like), weather (sunny, rain, heavy rain, snow, thunder, and the like), a group to which a character belongs, a combat stance of a group to which a character belongs (focus on a short-distance attack, focus on a long-range attach, focus on defense, focus on survival, and the like), a collection status of items that are essential for the progress of a game, remaining time until a character clears a given mission, security of a place where a character currently stays, whether villagers or towns-folks like or dislike a character, an era when a character is present (ancient, modern, modern, future, and the like), power distribution in a world where a character is present (demon king army dominates, humans dominate, and the like), an economic situation of a world where a character is present (boom, recession, famine, and the like), and a spreading situation of an infectious disease in a world where a character is present (no infectious disease, pandemic, epidemic, and the like).

When a speaker is a person present in the real world (for example, a game commentator, a participant of an event, or the like), an environment in which the speaker is present includes the following environments such as a place where a speaker currently stays (municipality, outdoor, indoor facility, and the like), the number of participants of speakers (the number of viewers watching a posted video, the number of participants of an event, and the like), an attribute of participants of speakers (classmates, work colleagues, first met, and the like), current time (for example, morning, noon, sunset, night, midnight, and the like), a traffic condition when a speaker moves (traffic jam, delay of train operation, and the like), weather near a place where a speaker currently stays or near home of the speaker (sunny, rain, heavy rain, snow, thunder, and the like), remaining time given to a speaker (remaining recording time of a video, time until the end of an event, and the like), security of a place where a speaker currently stays, an economic situation of an area where a speaker is present (boom, recession, and the like), and a spreading situation of an infectious disease in a world where a character is present (no infectious disease, pandemic, epidemic, and the like).

An environment where a speaker is present is not limited to the environments described above. Hereinafter, a case where an environment in which a speaker is present is a distance between an in-game character who is a speaker and an enemy character (a distance to the enemy character) will be described.

The calculation formula specifying unit 11Z specifies a calculation formula having a variable indicating a distance to an enemy character. The calculation formula specifying unit 11Z specifies the calculation formula 012 having a variable 1 indicating a "distance to an enemy character" with reference to FIG. 17. In FIG. 23, a bubble SB08A has an appearance of a bubble created by the bubble creating unit 12Z when a distance to an enemy character is fairly large. A bubble SB08B has an appearance of a bubble created by the bubble creating unit 12Z when a distance to an enemy character is reduced. A state in which an in-game character becomes tense because an enemy character is coming close is expressed as the number of thorns provided at a bubble frame.

As described above, the calculation formula specifying unit 11Z specifies one or more calculation formulas based on a numerical value indicating an environment in which a speaker of a line combined with a bubble is present. Accordingly, the bubble creating unit 12Z can create a bubble having an appearance suitable for the environment in which the speaker is present. Therefore, the interest of a player in a video game can be further improved.

FIG. 24 is a diagram showing a change of a bubble corresponding to a variable according to at least one of the embodiments of the present disclosure.

The calculation formula specifying unit 11Z specifies one or more calculation formulas based on the number of speakers of a line combined with a bubble. Here, the term "line combined with a bubble" refers to a line that is displayed in a manner of overlapping a frame image when the frame image of the bubble is displayed on a game screen or the like.

The calculation formula specifying unit 11Z specifies a calculation formula having a variable indicating the number of speakers of a line. The calculation formula specifying unit 11Z specifies the calculation formula 007 having a variable 1 indicating "the number of speakers of a line" with reference to FIG. 17. In FIG. 24, a bubble SB09A has an appearance of a bubble created by the bubble creating unit 12Z when the number of speakers is one. A bubble SB09B has an appearance of a bubble created by the bubble creating unit 12Z when the number of speakers is three. At the same time, the number of speakers of a line is expressed as the number of bubble frames that are concentrically overlapped with one another.

As described above, the calculation formula specifying unit 11Z specifies one or more calculation formulas based on the number of speakers of a line combined with a bubble. Accordingly, the bubble creating unit 12Z can create a bubble having an appearance suitable for the number of speakers. Therefore, the interest of a player in a video game can be further improved.

FIG. 25 is a diagram showing a change of a bubble corresponding to a variable according to at least one of the embodiments of the present disclosure.

The calculation formula specifying unit 11Z specifies one or more calculation formulas based on an operating time of a video game. The operating time may be an operating time of a server that controls the progress of the game. The operating time may be a time (play time) from when a user (player) having a user terminal starts the game to current time. The operating time may be an elapsed time when a time point at which a predetermined event occurs in the game in progress is set to a time point 0.

The calculation formula specifying unit 11Z specifies a calculation formula having a variable indicating an operating time of a video game. The calculation formula specifying unit 11Z specifies the calculation formula 006 having a variable 1 indicating "an operating time of a game" with reference to FIG. 17. In FIG. 25, a bubble SB10A has an appearance of a bubble created by the bubble creating unit 12Z when an operating time of a video game is short. A bubble SB10B has an appearance of a bubble created by the bubble creating unit 12Z when an operating time of a video game is long.

Here, a utilization example of a bubble shown in FIG. 25 will be described. For example, among in-game characters (main character) operated by a player, there is a character who is an assistant (a sidekick character). The sidekick character is called from another world, is created by magic, or the like such that the sidekick character accompanies the main character. When a predetermined period of time is elapsed, the sidekick character leaves the main character because the sidekick character returns to the other world, the main character who is a caller is short of magic, and the like. A line of the sidekick character is displayed on a game screen together with an image of a bubble created by the bubble creating unit 12Z based on the calculation formula 006. For example, in such a case, when an operating time of a video game increases, a bubble becomes more transparent. Accordingly, it is possible to visually express a remaining time until a time limit at which the sidekick character leaves the main character. In addition, in a case where the main character is poisoned, a state in which the influence of the poison is diminished may be shown by a bubble created by the bubble creating unit 12Z based on the calculation formula 006.

The calculation formula specifying unit 11Z may specify a calculation formula such that a shape of a bubble changes when an operating time of a video game increases. For example, the calculation formula specifying unit 11Z specifies a calculation formula that defines a shape of which a basic shape is a rectangle without corners and becomes closer to a circle when an elapsed time increases. Accordingly, it is possible to present a situation in which personality of a young speaker who is an in-game character becomes gentle when the age increases.

As described above, the calculation formula specifying unit 11Z specifies one or more calculation formulas based on an operating time of a video game. Accordingly, the bubble creating unit 12Z can create a bubble having an appearance suitable for the operating time of the video game. Therefore, the interest of a player in a video game can be further improved.

Figure 26:
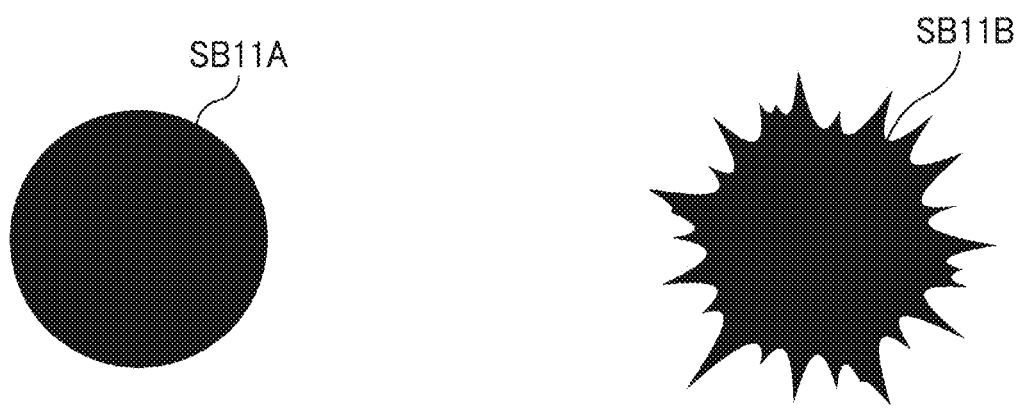
FIG. 26 is a diagram showing a change of a bubble corresponding to a variable according to at least one of the embodiments of the present disclosure.

FIG. 26 is a diagram showing a change of a bubble corresponding to a variable according to at least one of the embodiments of the present disclosure.

The calculation formula specifying unit 11Z specifies one or more calculation formulas based on a gazing position on a game screen of a player of a video game. Here, the gazing position on a game screen refers to a position on the game screen where the game player gazes. For example, when a cursor is displayed on a game screen such as a personal computer, a gazing position on a game screen may refer to a position of the cursor. When a game screen is displayed on a touch panel display, a gazing position on a game screen may refer to a position where a user (a player of a video game) taps the touch panel display. When a game screen is displayed on VR goggles having a gaze detection function, a gazing position on a game screen may refer to a position indicated by a line of sight of a person who wears the VR goggles.

The calculation formula specifying unit 11Z specifies a calculation formula having a variable indicating a gazing position on a game screen of a player of a video game. The calculation formula specifying unit 11Z specifies the calculation formula 011 having a variable 1 indicating "coordinate values (x, y) of a gazing position on a game screen" with reference to FIG. 17. In FIG. 26, a bubble SB11A has an appearance of a bubble created by the bubble creating unit 12Z when a gazing position is not located in a predetermined area of a game screen. A bubble SB11B has an appearance of a bubble created by the bubble creating unit 12Z when a gazing position is located in a predetermined area of a game screen. When a gazing position is located in a predetermined area of a game screen, thorns of a bubble frame are extended.

Here, a utilization example of a bubble shown in FIG. 26 will be described. A player of a video game experiences a game from the viewpoint of a main character A who is an in-game character. For example, another in-game character (for example, a partner B belonging to the same team with the main character A) who is featured on a game screen is speaking in the game, and a line of the partner B is displayed in combination with a bubble. The predetermined area of a game screen is an area where a bubble is displayed. At this time, a case where a gazing position is located in the predetermined area of the game screen is a case where the main character A (player) is looking at a bubble related to the utterance of the partner B. This corresponds to a case where the main character A (player) is listening to the utterance of the partner B. Therefore, it can be expressed that the partner B is aware of the fact that "the main character A (player) is listening to the utterance of the partner B" by extending thorns of a bubble frame.

Another utilization example of the bubble shown in FIG. 26 will be described. For example, a rare item that increases attack power of the main character A (player) is hidden somewhere on a game screen. The main character A (player) moves the line of sight (or moves a cursor or taps) to search for the rare item. Here, the main character A (player) can find a rare item only in a time zone in which the partner B reads an incantation of "search" with a gesture. Texts corresponding to the incantation read by the partner B are displayed in a bubble frame. When a gazing position of the main character A (player) overlaps a position where the rare item is hidden, thorns of the bubble frame are extended. Accordingly, the partner B reads the incantation with a gesture, and the partner B cannot give a hint regarding the position of the rare item to the main character A (player) using words or a gesture, but the partner B can express a situation in which a hint is given by some other methods such as a sign.

As described above, the calculation formula specifying unit 11Z specifies one or more calculation formulas based on a gazing position on a game screen of a player of a video game. Accordingly, the bubble creating unit 12Z can create a bubble having an appearance suitable for the gazing position on the game screen of the player. Therefore, the interest of a player in a video game can be further improved.

Figure 27:
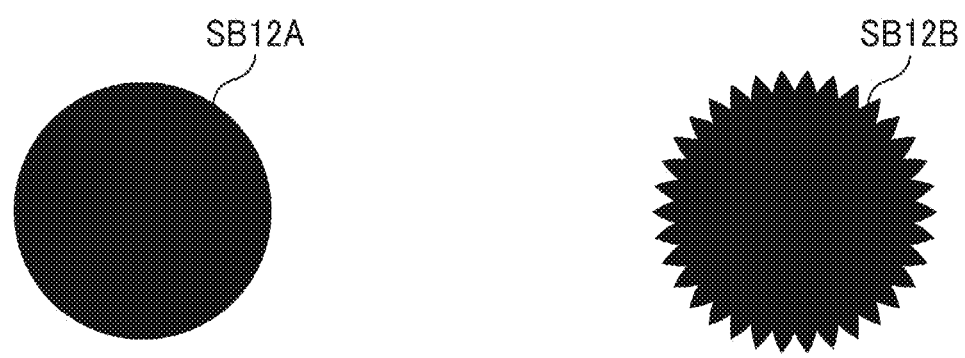
FIG. 27 is a diagram showing a change of a bubble corresponding to a variable according to at least one of the embodiments of the present disclosure.

FIG. 27 is a diagram showing a change of a bubble corresponding to a variable according to at least one of the embodiments of the present disclosure.

The calculation formula specifying unit 11Z specifies one or more calculation formulas based on a numerical value indicating a user experience offered to a player of a video game.

(User Experience)

Here, a user experience (UX) is a generic term for an experience obtained through a product or a service. For a video game, a user experience refers to an experience obtained when a player plays the video game. For example, feelings of a player when the player plays a game correspond to a user experience, such as tension, calming down (relaxation), laughing, anger, satisfaction, and unsatisfaction. The user experience in a video game is not limited to those described above.

(Digitization of Tension Level)

"Tension" and "relaxation" that are examples of a user experience described above will be described. For example, a player in a game may be desired to get tense, for example, when a user starts to get bored in playing the game. On the other hand, when a state of tension continues, a player is likely to get tired, so that it is desired to relax the player. Therefore, a numerical index such as a tension level is introduced in order to maintain an appropriate tension level of a player. For example, when a player is not tense at all, the tension level is set to 0. When the player is extremely tense, the tension level is set to 10. Here, although a maximum value of the tension level is defined as 10, the maximum value of the tension level may be a value other than 10.

The calculation formula specifying unit 11Z specifies a calculation formula having a variable indicating a tension level. The calculation formula specifying unit 11Z specifies the calculation formula 013 having a variable 1 indicating "a tension level of a player" with reference to FIG. 17. In FIG. 27, a bubble SB12A has an appearance of a bubble created by the bubble creating unit 12Z when it is desired that a player is not tense (when it is desired to reduce a tension level of a player). A bubble SB12B has an appearance of a bubble created by the bubble creating unit 12Z when it is desired that a player is tense (when it is desired to increase a tension level of a player).

For example, a bubble created by the bubble creating unit 12Z based on the calculation formula 013 is used for a narration display in a game. In this case, a speaker of the narration is a game system. A stimulus given to a player by a narration display using the bubble SB12B having thorns is stronger than that by a narration display using the bubble SB12A having no thorns. Therefore, a player can become more tense by using the bubble SB12B having thorns. The calculation formula specifying unit 11Z may specify a calculation formula such that a color of a bubble comes close to red when a tension level desired to be given to a player is high. Since red is a color offering a strong visual stimulus, it is possible to make a player more tense.

User experiences other than "tension" and "relaxation" offered to a player may be digitized. The calculation formula specifying unit 11Z specifies a calculation formula having a variable indicating the digitized user experiences.

As described above, the calculation formula specifying unit 11Z specifies one or more calculation formulas based on a numerical value indicating a user experience offered to a player of a video game. Accordingly, the bubble creating unit 12Z can create a bubble having an appearance suitable for a user experience desired to be offered to a player of a video game. Therefore, the interest of a player in a video game can be further improved.

Supplementary Items for Sixth Embodiment

The calculation formula specifying unit 11Z may specify a calculation formula that does not have a variable (for example, the calculation formula 005 in FIG. 17). When an appearance of a bubble does not need to change, a predetermined fixed value may be input to a variable part of a calculation formula having a variable (for example, the calculation formulas 001 to 004 and 006 to 013 in FIG. 17). When a calculation formula includes two or more variables, a predetermined fixed value may be input to some of the variables.

An element to be considered (hereinafter referred to as a consideration element) in specifying a calculation formula may not be used as a variable included in a calculation formula. Non-limiting examples of the consideration element include content of a line combined with a bubble (see FIG. 18), the number of characters or words of a line combined with a bubble (see FIG. 19), a volume or voice quality of voice data corresponding to a line combined with a bubble (see FIGS. 20 and 21), an attribute of a speaker of a line combined with a bubble (see FIG. 22), an environment in which a speaker of a line combined with a bubble is present (see FIG. 23), the number of speakers of a line combined with a bubble (see FIG. 24), an operating time of a video game (see FIG. 25), a gazing position on a game screen of a player of a video game (see FIG. 26), and a user experience offered to a player of a video game (see FIG. 27).

The consideration elements may not be digitized. More specifically, the content of a line combined with a bubble that is a consideration element (see FIG. 18), the voice quality of voice data corresponding to a line (see FIG. 21), the attribute of a speaker (see FIG. 22), the environment in which a speaker of a line is present (see FIG. 23), and the user experience offered to a player of a video game (see FIG. 27) may not be digitized when a calculation formula is specified. For example, a calculation formula to be specified by the calculation formula specifying unit 11Z may be determined in advance based on various conditions obtained from the consideration elements described above, for example, a calculation formula N may be used when a predetermined keyword is included in a line, a calculation formula N+1 may be used when the number of characters or words of a line is less than 20, a calculation formula N+2 may be used when the number of characters or words of a line is 20 or more, and a calculation formula N+3 may be used when a user experience offered to a player of a video game is "it is desired to make a player laugh". For example, in such a case, a consideration element that is not digitized can be used as a determination criterion (a criterion for selecting a calculation formula) for specifying a calculation formula.

When a calculation formula is specified, a plurality of consideration elements may be used in combination. Here, the calculation formula specifying unit 11Z specifies the calculation formula 004 having a variable 1 indicating "a bravery level of a character (1 to 255)" and a variable 2 indicating "a distance to an enemy character" with reference to FIG. 17. The "bravery level of a character" corresponds to an attribute of a speaker (see FIG. 22), and the "distance to an enemy character" corresponds to an environment in which a speaker of a line is present (see FIG. 23). As described above, various consideration elements are classified into a plurality of categories (see FIGS. 18 to 27), and the consideration elements are divided and described for each category. Alternatively, the calculation formula specifying unit 11Z may specify a calculation formula in consideration of consideration elements included in different categories. When the calculation formula specifying unit 11Z specifies the calculation formula 004, the bubble creating unit 12Z creates a bubble having a circular basic shape.

Expansion to contraction of the created circular bubble is repeated at a predetermined cycle. An animation display expresses a heartbeat of a character who is about to encounter an enemy character. When a distance to an enemy character becomes short, a speed at which a radius of the circle changes increases, and thus the heart beat becomes faster. A brave character can calmly deal with an enemy character while a non-brave character is scared when the non-brave character encounters an enemy character. Therefore, an amplitude of a radius of the circle increases when a bravery level becomes low. That is, the heart beat becomes faster. The calculation formula 004 expresses a mood of a character using the created bubble.

In order to specify a speaker, a tail may be added to a bubble. The tail added to a bubble may be referred to as "foot", "number", "arrow", "pointy part", or "notch". Here, a portion added to a bubble in order to specify a speaker is expressed as a "tail". A shape of a tail is not limited to a triangle (see FIG. 28), and can be various shapes. For example, the tail may have a bent shape. There is also a "round tail" or the like formed by continuously arranging a plurality of circles. Hereinafter, an example of a generally used triangular tail will be described.

Figure 28:
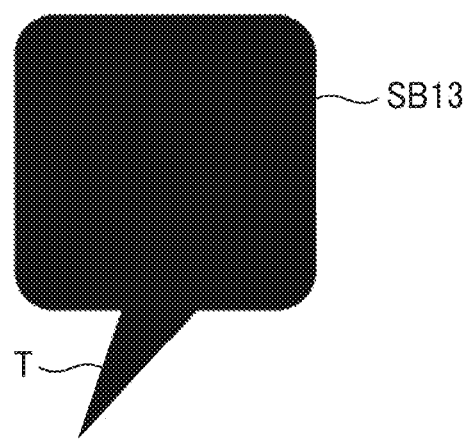
FIG. 28 is a diagram showing a bubble added with a tail according to at least one of the embodiments of the present disclosure.

FIG. 28 is a diagram showing a bubble added with a tail according to at least one of the embodiments of the present disclosure. A triangular tail T is added to a bubble SB13. The calculation formula specifying unit 11Z may specify a calculation formula that defines an appearance of the bubble SB13 and a calculation formula that defines an appearance of the tail T. The bubble creating unit 12Z creates the bubble SB13 added with the tail T by using the calculation formula that defines the appearance of the bubble SB13 and the calculation formula that defines the appearance of the tail T.

It is considered that the number of patterns of a shape available for the tail T is smaller than the number of patterns of a shape available for the bubble SB13. Therefore, an image that is an asset (material) of the tail T may be stored in a storage unit (a storage medium or storage device), and the tail T may be added to the created bubble SB13 later.

Summary of Sixth Embodiment

According to an aspect of the sixth embodiment, since various types of calculation formulas can be defined, various bubbles can be provided.

According to an aspect of the sixth embodiment, since various bubbles are provided, a performance effect presented to a user who sees the displayed bubble can be improved.

According to an aspect of the sixth embodiment, since various bubbles are provided, the interest of a player in a video game in which the bubbles are displayed can be improved.

As described above, embodiments of the present application solve one or two or more shortcomings. It should be noted that effects of respective embodiments are examples of non-limiting effects or effects.

In the embodiments described above, the plurality of user terminals 20, 201 to 20N, and 50, the server 10, and the server 40 execute various processing described above in accordance with various control programs (for example, a video game processing program and a bubble creation program) stored in storage devices respectively provided in the user terminals 20, 201 to 20N, and 50, the server 10, and the server 40.

Configurations of the video game processing system 100 and the video game processing system 101 are not limited to the configurations described as the examples of the embodiments described above. For example, a part or all of processing described as processing executed by the user terminal may be executed by the server 10 or the server 40, or some or all of processing described as processing executed by the server 10 or the server 40 may be executed by any one of the plurality of user terminals 20, 201 to 20N, and 50 (for example, the user terminal 20). A part or all of the storage units (storage media or storage devices) provided in the server 10 or the server 40 may be provided in any one of the plurality of user terminals 20, 201 to 20N, and 50. That is, in the video game processing system 100 or the video game processing system 101, some or all of functions provided in one of the user terminal and the server may be provided in the other one.

A program may be configured to achieve a part or all of functions described as examples of the embodiments described above by a single device that does not include a communication network.

Further, the embodiments described above may be applied to a configuration other than a video game. The embodiments described above can be applied to, for example, an application program for displaying a bubble that is executed on any computing device such as a personal computer and a mobile terminal, a program for creating a bubble when a bubble is displayed on a screen of a broadcast program such as a television or a video distribution, a video editing program having a function of creating a bubble when a video (including a posted video) to be played back by a playback device is created or edited, a program for creating a bubble image when the bubble image is displayed on a screen (including a screen projected on a projection screen) displayed by a display device in a talk event or the like, a device in which the programs described above are installed, and the like. In this case, a game screen in the embodiments described above can be referred to as a screen displayed by a display device.

APPENDIX

In the embodiments described above, at least the following disclosures are described so that a person having common knowledge in the field to which the disclosure belongs can carry out the embodiments.

[1] A bubble creation program for causing a server that controls the progress of a video game to achieve a calculation formula specifying function of specifying one or more calculation formulas, and a bubble creation function of creating a bubble having an appearance defined by the calculation formula.

[2] The bubble creation program according to [1], in which the calculation formula specifying function specifies one or more calculation formulas having a variable, and the bubble creation function creates the bubble whose appearance changes in accordance with a change of a value of the variable.

[3] The bubble creation program according to [1] or [2], in which the server achieves a bubble display function of displaying the bubble on a game screen.

[4] The bubble creation program according to any one of [1] to [3], in which the calculation formula specifying function specifies one or more calculation formulas based on a numerical value indicating content of a line combined with the bubble.

[5] The bubble creation program according to any one of [1] to [4], in which
the calculation formula specifying function specifies one or more calculation formulas based on the number of characters or words of a line combined with the bubble.

[6] The bubble creation program according to any one of [1] to [5], in which
the calculation formula specifying function specifies one or more calculation formulas based on a volume or voice quality of voice data corresponding to a line combined with the bubble.

[7] The bubble creation program according to any one of [1] to [6], in which
the calculation formula specifying function specifies one or more calculation formulas based on an attribute value of a speaker of a line combined with the bubble.

[8] The bubble creation program according to any one of [1] to [7], in which
the calculation formula specifying function specifies one or more calculation formulas based on a numerical value indicating an environment in which a speaker of a line combined with the bubble is present.

[9] The bubble creation program according to any one of [1] to [8], in which
the calculation formula specifying function specifies one or more calculation formulas based on the number of speakers of a line combined with the bubble.

[10] The bubble creation program according to any one of [1] to [9], in which
the calculation formula specifying function specifies one or more calculation formulas based on an operating time of the video game.

[11] The bubble creation program according to any one of [1] to [10], in which
the calculation formula specifying function specifies one or more calculation formulas based on a gazing position on a game screen of a player of the video game.

[12] The bubble creation program according to any one of [1] to [11], in which
the calculation formula specifying function specifies one or more calculation formulas based on a numerical value indicating a user experience offered to a player of the video game.

[13] A video game processing program for causing a user terminal capable of communicating with the server to achieve at least one of the functions achieved by the server caused by the bubble creation program according to any one of [1] to [12].

[14] A server in which the bubble creation program according to any one of [1] to [12] is installed.

[15] A video game processing system that is provided with a communication network, a server, and a user terminal and controls the progress of a video game, the video game processing system including
a calculation formula specifying unit configured to specify one or more calculation formulas, and
a bubble creating unit configured to create a bubble having an appearance defined by the calculation formula.

[16] A bubble creation program for causing a user terminal to achieve
a calculation formula specifying function of specifying one or more calculation formulas, and
a bubble creation function of creating a bubble having an appearance defined by the calculation formula.

[17] A user terminal in which the bubble creation program according to [16] is installed.

[18] A method for creating a bubble by a computer device including
a calculation formula specifying processing of specifying one or more calculation formulas, and
a bubble creation processing of creating a bubble having an appearance defined by the calculation formula.

[19] A method for creating a bubble by a video game processing system including a communication network, a server, and a user terminal, the method for creating a bubble including
a calculation formula specifying processing of specifying one or more calculation formulas, and
a bubble creation processing of creating a bubble having an appearance defined by the calculation formula.

[20] A bubble creation apparatus that displays a bubble on a game screen of a video game, the bubble creation apparatus comprising:
a calculation formula specifying unit that is configured to specify one or more calculation formulas; and
a bubble creation unit that is configured to create a bubble having an appearance defined by the calculation formula.

[21] A server that controls a progress of a video game and is communicably connected to a user terminal, the server comprising:
a calculation formula specifying portion that is configured to specify one or more calculation formulas; and
a bubble creation portion that is configured to create a bubble having an appearance defined by the calculation formula.

INDUSTRIAL APPLICABILITY

According to one embodiment of the present disclosure, the present disclosure is useful in improving the interest of a player in a video game.

What is claimed is:
1. A computer readable non-transitory medium storing therein a bubble creation program which, when executed by a processor of a server, causes the processor to execute functions comprising:
communicating with one or more user terminals via a communication network;
specifying one or more calculation formulas among a plurality of predefined calculation formulas based on one or more consideration elements, the predefined calculation formulas stored in a storage unit; and
creating a bubble having an appearance defined by the one or more calculation formulas, the one or more calculation formulas including a plurality of variables, wherein
creating the bubble includes dynamically creating a bubble image by calculation based on the one or more calculation formulas without the bubble image being statically stored in the storage unit, and
the calculation includes changing values of the variables based on the one or more consideration elements.

2. The computer readable non-transitory medium according to claim 1, wherein creating the bubble includes changing the appearance of the bubble in accordance with the changed values of the variables.

3. The computer readable non-transitory medium according to claim 1, wherein the functions further include displaying the bubble image on a game screen.

4. The computer readable non-transitory medium according to claim 1, wherein the one or more consideration elements include a numerical value indicating content of a line combined with the bubble.

5. The computer readable non-transitory medium according to claim 1, wherein the one or more consideration elements include a number of characters or words in a line combined with the bubble.

6. The computer readable non-transitory medium according to claim 1, wherein the one or more consideration elements include a volume or voice quality of voice data corresponding to a line combined with the bubble.

7. A video game processing system configured to control a progress of a video game, the system comprising:
a communication network;
a server;
a user terminal; and
a processor configured to:
communicate between the server and the user terminal via the communication network;
specify one or more calculation formulas among a plurality of predefined calculation formulas based on one or more consideration elements, the predefined calculation formulas stored in a storage unit; and
create a bubble having an appearance defined by the one or more calculation formulas, the one or more calculation formulas including a plurality of variables, wherein
creating the bubble includes dynamically creating a bubble image by calculation based on the one or more calculation formulas without the bubble image being statically stored in the storage unit, and
the calculation includes changing values of the variables based on the one or more consideration elements.

8. A computer readable non-transitory medium storing therein a bubble creation program which, when executed, causes a user terminal to execute functions comprising:
specifying one or more calculation formulas among a plurality of predefined calculation formulas based on one or more consideration elements, the predefined calculation formulas stored in a storage unit; and
creating a bubble having an appearance defined by the one or more calculation formulas, the one or more calculation formulas including a plurality of variables, wherein
creating the bubble includes dynamically creating a bubble image by calculation based on the one or more calculation formulas without the bubble image being statically stored in the storage unit, and
the calculation includes changing values of the variables based on the one or more consideration elements.

9. The computer readable non-transitory medium according to claim 1, wherein
the plurality of predefined calculation formulas define a plurality of basic shapes of a bubble, and
creating the bubble image includes changing the values of the valuables of the specified one or more calculation formulas based on the one or more consideration elements to change the basic shapes of the bubble.

10. The computer readable non-transitory medium according to claim 1, wherein the consideration elements are classified in a plurality of categories.

11. The video game processing system according to claim 7, wherein creating the bubble includes changing the appearance of the bubble in accordance with the changed values of the variables.

12. The video game processing system according to claim 7, wherein the functions further include displaying the bubble image on a game screen.

13. The video game processing system according to claim 7, wherein the one or more consideration elements include at least one of a numerical value indicating content of a line combined with the bubble, a number of characters or words in a line combined with the bubble, and a volume or voice quality of voice data corresponding to a line combined with the bubble.

14. The video game processing system according to claim 7, wherein
the plurality of predefined calculation formulas define a plurality of basic shapes of a bubble, and
creating the bubble image includes changing the values of the valuables of the specified one or more calculation formulas based on the one or more consideration elements to change the basic shapes of the bubble.

15. The video game processing system according to claim 7, wherein the consideration elements are classified in a plurality of categories.

16. The computer readable non-transitory medium according to claim 8, wherein creating the bubble includes changing the appearance of the bubble in accordance with the changed values of the variables.

17. The computer readable non-transitory medium according to claim 8, wherein the functions further include displaying the bubble image on a game screen.

18. The computer readable non-transitory medium according to claim 8, wherein the one or more consideration elements include at least one of a numerical value indicating content of a line combined with the bubble, a number of characters or words in a line combined with the bubble, and a volume or voice quality of voice data corresponding to a line combined with the bubble.

19. The computer readable non-transitory medium according to claim 8, wherein
the plurality of predefined calculation formulas define a plurality of basic shapes of a bubble, and
creating the bubble image includes changing the values of the valuables of the specified one or more calculation formulas based on the one or more consideration elements to change the basic shapes of the bubble.

20. The computer readable non-transitory medium according to claim 8, wherein the consideration elements are classified in a plurality of categories.

* * * * *